United States Patent
Cheng et al.

(10) Patent No.: US 8,265,644 B2
(45) Date of Patent: Sep. 11, 2012

(54) SERVICE PROVIDING APPARATUS, SERVICE CONSUMING APPARATUS, AND SERVICE TRANSMITTING METHOD THEREOF

(75) Inventors: Yen-Chieh Cheng, Taipei (TW); Shiann-Tsong Sheu, Taipei (TW); Wen-Yao Chang, Zhonghe (TW)

(73) Assignee: Institute for Information Industry, Taipei (TW)

( * ) Notice: Subject to any disclaimer, the term of this patent is extended or adjusted under 35 U.S.C. 154(b) by 178 days.

(21) Appl. No.: 12/957,383

(22) Filed: Nov. 30, 2010

(65) Prior Publication Data

US 2012/0088511 A1 Apr. 12, 2012

(30) Foreign Application Priority Data

Oct. 8, 2010 (TW) .............................. 99134366 A

(51) Int. Cl.
*H04W 72/00* (2009.01)
(52) U.S. Cl. .................... 455/450; 455/452.1; 455/454; 455/464; 455/515
(58) Field of Classification Search ................. 455/450, 455/452.1, 454, 464, 515
See application file for complete search history.

(56) References Cited

U.S. PATENT DOCUMENTS

| | | |
|---|---|---|
| 2008/0025337 A1 | 1/2008 | Smith et al. |
| 2009/0219856 A1 | 9/2009 | Richardson et al. |
| 2011/0021233 A1* | 1/2011 | Tsuboi et al. ................. 455/513 |
| 2011/0255482 A1* | 10/2011 | Holland et al. ............... 370/329 |

OTHER PUBLICATIONS

Jun. 6, 2011 office action by the German Intellectual Property Office for Patent Application No. 10 2010 061 153.0 (German counterpart to U.S Appl. No. 12/957,383), 8 pages.

English translation of the Jul. 20, 2011 office action by the German Intellectual Property Office for Patent Application No. Document No. 10 2010 061 153.0, 2 pages.

* cited by examiner

*Primary Examiner* — Barry Taylor
(74) *Attorney, Agent, or Firm* — Skaar Ulbrich Macari, P.A.

(57) ABSTRACT

A service providing apparatus, a service consuming apparatus, and a service transmitting method thereof are provided. The service providing apparatus is able to pre-allocate a plurality of service consuming apparatus into different groups, to pre-schedule the groups in a control channel, and to pre-schedule the groups in at least one channel. Accordingly, the channel resource can be consumed more efficiently by the service consuming apparatus.

28 Claims, 14 Drawing Sheets

SERVICE PROVIDING APPARATUS, SERVICE CONSUMING APPARATUS, AND SERVICE TRANSMITTING METHOD THEREOF

PRIORITY

This application claims priority to Taiwan Patent Application No. 099134366 filed on Oct. 8, 2010, which is hereby incorporated by reference in its entirety.

FIELD

The present invention relates to a service providing apparatus, a service consuming apparatus and service transmitting methods thereof. More particularly, the service providing apparatus, the service consuming apparatus and the service transmitting methods thereof of the present invention utilize grouping and scheduling ways for the service consuming apparatuses to access the service providing apparatuses in a control channel and to consume service resources provided by the service providing apparatus in a service channel.

BACKGROUND

Owing to advantages of wireless networks such as convenience in use, low deployment cost and high mobility, various wireless network standards have been developed rapidly in the modern network technologies. Although communication protocols of these wireless network standards vary greatly from each other, most of the wireless network standards have similar service architectures. Particularly, the service architectures of many wireless networks include service providing apparatus and service consuming apparatus, in which network service resources are provided by the service providing apparatus to the service consuming apparatus.

For instance, in a Vehicle-to-Roadside communication system of telematics, services are provided by a road side unit (RSU) to an on-board unit (OBU). However, there are still some significant problems with service transmissions in such a Vehicle-to-Roadside communication system. Specifically, if only a single transceiver is equipped in the OBU of the Vehicle-to-Roadside communication system, then when the OBU is accessing a control channel in a time period, the service channel will remain in an idle status in the corresponding time period. Similarly, when the OBU is consuming resources of the service channel in a time period, then the control channel will remain in an idle status in the corresponding time period. Consequently, this results in significantly reduced utilization efficiency of the channel resources. On the other hand, in order to improve the aforesaid problem, a plurality of transceivers may be equipped in the OBU so that it can access the control channel and the service channel simultaneously; however, since the transceivers are very costly, this would drive the overall cost of the OBU to be significantly higher.

Accordingly, a need still exists in the art to overcome the drawbacks of the prior art by improving the utilization efficiency of channels while still saving the hardware cost.

SUMMARY

To solve the aforesaid problem of low utilization efficiency of the channel resources, an objective of certain embodiments of the present invention is to provide a service providing apparatus, a service consuming apparatus and service transmitting methods thereof. Firstly, the service providing apparatus divides a plurality of service consuming apparatuses in a wireless network into different groups, and further allocates the groups into different group sets. Then, the service providing apparatus pre-schedules the group sets in a control channel and pre-schedules the groups in at least one service channel. Thereby, the service resources can be consumed by the service consuming apparatuses according to the schedules so as to make more efficient use of the channel resources.

To accomplish the aforesaid objective, certain embodiments of the present invention provide a service transmitting method for a service providing apparatus. The service providing apparatus is adapted to connect to a plurality of service consuming apparatuses via a wireless network. The service transmitting method comprises the following steps of: (a) enabling the service providing apparatus to determine a control period schedule of a first coordination set and a second coordination set in a control channel, and determine a service period schedule of a first service apparatus group and a second service apparatus group in at least one service channel, wherein the first coordination set at least comprises the first service apparatus group, and the second coordination set at least comprises the second service apparatus group; (b) enabling the service providing apparatus to transmit a broadcast message, which comprises the control period schedule and the service period schedule, to the service consuming apparatuses, wherein the broadcast message is configured to notify the service consuming apparatuses of being allocated into the first service apparatus group and the second service apparatus group respectively, to notify the service consuming apparatuses allocated into the first service apparatus group of being included in the first coordination set, and to notify the service consuming apparatuses allocated into the second service apparatus group of being included in the second coordination set; (c) enabling the service providing apparatus to, according to the control period schedule, receive an access request from the first service apparatus group included in the first coordination set in a first control period of the control channel and receive an access request from the second service apparatus group included in the second coordination set in a second control period of the control channel; and (d) enabling the service providing apparatus to provide, in the at least one service channel, a first service resource to the first service apparatus group in a first service period and to provide a second service resource to the second service apparatus group in a second service period according to the service period schedule.

To accomplish the aforesaid objective, certain embodiments of the present invention further provide a service providing apparatus which is adapted to connect to a plurality of service consuming apparatuses via a wireless network. The service providing apparatus comprises a processing module, a transceiver and a service module. The processing module is configured to determine a control period schedule of a first coordination set and a second coordination set in a control channel, and to determine a service period schedule of a first service apparatus group and a second service apparatus group in at least one service channel. The first coordination set at least comprises the first service apparatus group, and the second coordination set at least comprises the second service apparatus group. The transceiver is configured to transmit a broadcast message, which comprises the control period schedule and the service period schedule, to the service consuming apparatuses. The broadcast message is configured to notify the service consuming apparatuses of being allocated into the first service apparatus group and the second service apparatus group respectively, to notify the service consuming apparatuses allocated into the first service apparatus group of being included in the first coordination set, and to notify the service consuming apparatuses allocated into the second service apparatus group of being included in the second coordination set. The transceiver is further configured to, according to the control period schedule, receive an access request from the first service apparatus group included in the first coordination set in a first control period of the control channel and receive an access request from the second service apparatus group included in the second coordination set in a second control period of the control channel. The service module is configured to provide, in the at least one service channel, a first service resource to the first service apparatus group in a first service period and provide a second service resource to the second service apparatus group in a second service period according to the service period schedule.

To accomplish the aforesaid objective, certain embodiments of the present invention further provide a service transmitting method for a service consuming apparatus. The service consuming apparatus is adapted to connect to a service providing apparatus via a wireless network. The service transmitting method comprises the following steps of: (a) enabling the service consuming apparatus to receive a broadcast message from the service providing apparatus, wherein the broadcast message comprises a control period schedule and a service period schedule and is configured to notify the service consuming apparatus of being allocated into a service apparatus group, and to notify the service consuming apparatus that the service apparatus group is included in a coordination set; (b) enabling the service consuming apparatus to transmit an access request in a control period of a control channel according to the control period schedule of the broadcast message, wherein the control period schedule records a schedule of the coordination set in the control channel; and (c) enabling the service consuming apparatus to consume a service resource provided by the service providing apparatus in a service period of at least one service channel according to the service period schedule of the broadcast message, wherein the service period schedule records a schedule of the service apparatus group in the at least one service channel.

To accomplish the aforesaid objective, certain embodiments of the present invention further provide a service consuming apparatus which is adapted to connect to a service providing apparatus via a wireless network. The service consuming apparatus comprises a transceiver and a processing module. The transceiver is configured to receive a broadcast message from the service providing apparatus. The broadcast message comprises a control period schedule and a service period schedule and is configured to notify the service consuming apparatus of being allocated into a service apparatus group, and to notify the service consuming apparatus that the service apparatus group is included in a coordination set. The transceiver is further configured to transmit an access request in a control period of a control channel according to the control period schedule of the broadcast message, wherein the control period schedule records a schedule of the coordination set in the control channel. The processing module is configured to consume a service resource provided by the service providing apparatus in a service period of at least one service channel according to the service period schedule of the broadcast message, wherein the service period schedule records a schedule of the service apparatus group in the at least one service channel.

According to the above descriptions, the service providing apparatus of certain embodiments of the present invention divides a plurality of service consuming apparatuses in a wireless network into different groups and further allocates the groups into different group sets. Then, the service providing apparatus pre-schedules the group sets in a control channel and pre-schedules the groups in at least one service channel. Thereby, the service resources can be consumed by the service consuming apparatuses according to the schedules so as to make more efficient use of the channel resources.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following description, the service providing apparatus, the service consuming apparatus, and the service transmitting methods thereof according to the present invention will be explained with reference to example embodiments thereof. It shall be appreciated that, these embodiments are not intended to limit the present invention to any specific example, embodiment, environment, applications or particular implementations described in these embodiments. Therefore, description of these example embodiments is only for purpose of illustration rather than to limit the present invention.

Figure 1A:
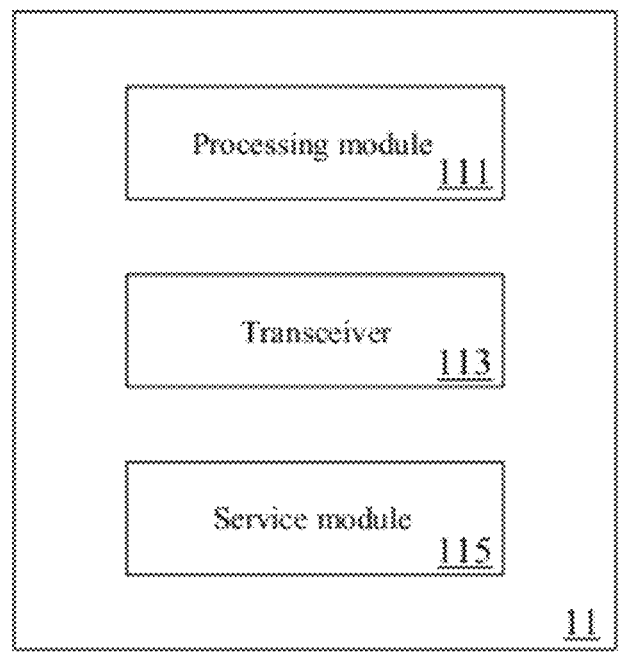
FIG. 1A is a schematic view of a service providing apparatus of a first embodiment of the present invention.
Figure 1B:
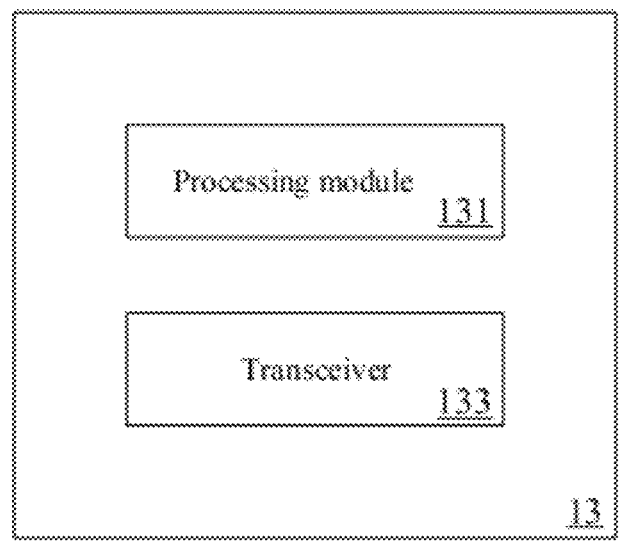
FIG. 1B is a schematic view of a service consuming apparatus of the first embodiment of the present invention.

Referring to FIG. 1A and FIG. 1B, schematic views of a service providing apparatus 11 and a schematic view of a service consuming apparatus 13 of a first embodiment of the present invention are depicted therein respectively. The service providing apparatus 11 comprises a processing module 111, a transceiver 113 and a service module 115. The service consuming apparatus 13 comprises a processing module 131 and a transceiver 133. Functions of and interactions between the individual modules of the service providing apparatus 11 and service consuming apparatus 13 will be detailed hereinafter.

Figure 2A:
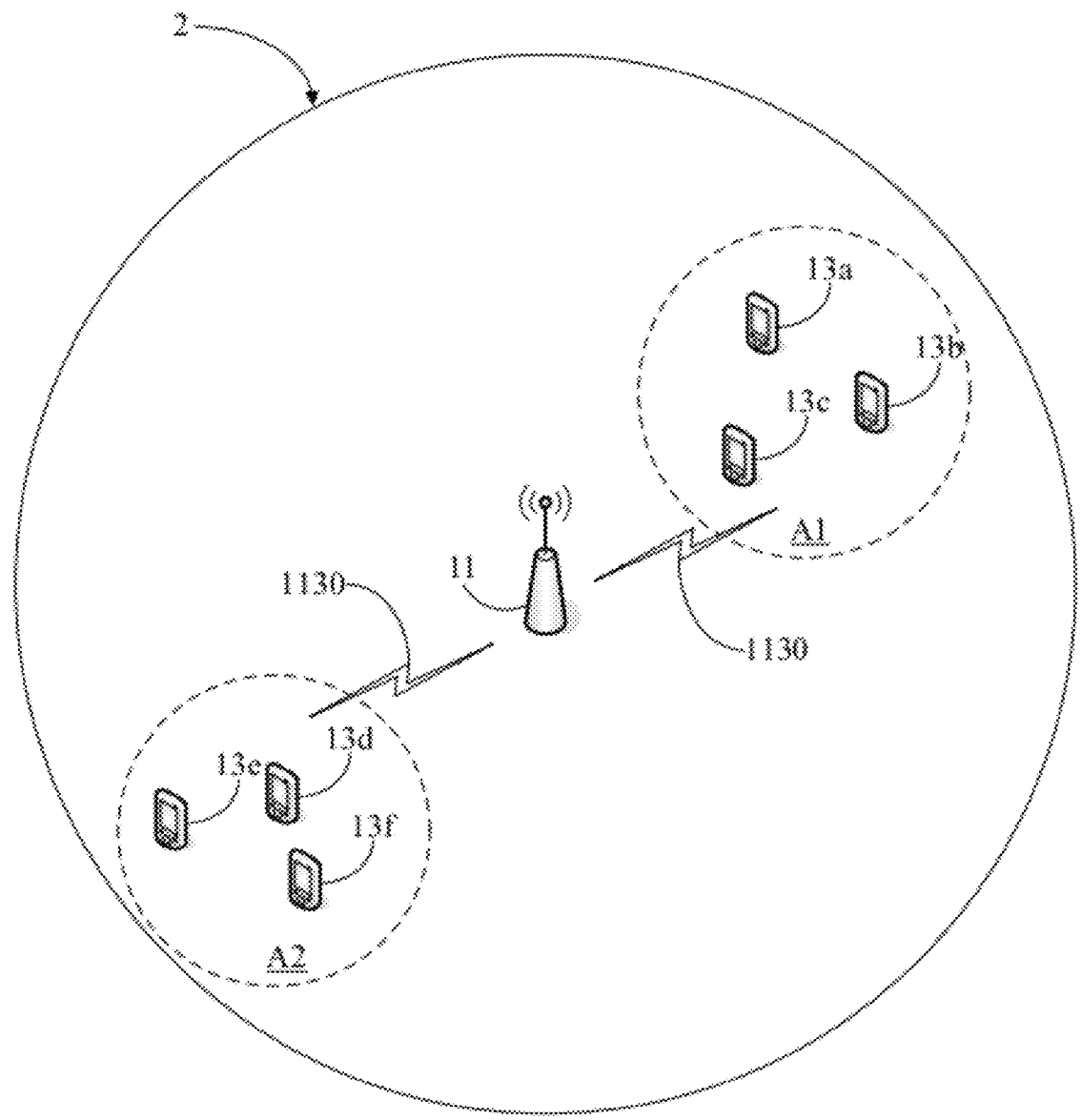
FIG. 2A is a schematic view of a wireless network of the first embodiment of the present invention.
Figure 2B:
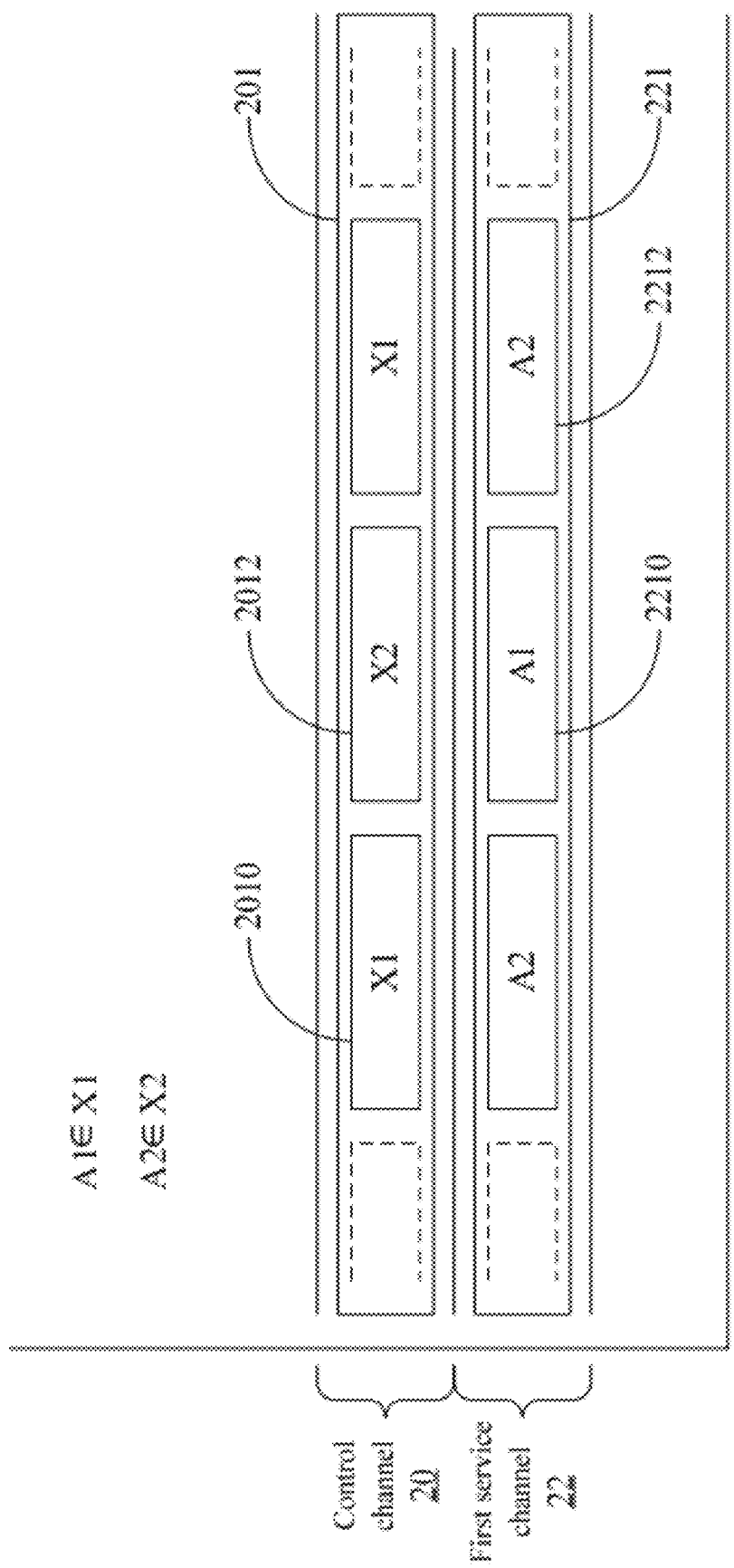
FIG. 2B is a schematic view illustrating usage of channels of the first embodiment of the present invention.

Please refer to FIG. 2A and FIG. 2B together. FIG. 2A is a schematic view of a wireless network 2 of the first embodiment of the present invention, in which the service providing apparatus 11 connects to a plurality of service consuming apparatuses 13a~13f via the wireless network 2. FIG. 2B is a schematic view illustrating usage of channels of the first embodiment of the present invention. It shall be emphasized that, the service consuming apparatuses 13a~13f are just identical to the aforesaid service consuming apparatus 13 in terms of the hardware architecture thereof, and are labeled with different reference numerals here just for convenience of the following description.

Initially, the processing module 111 of the service providing apparatus 11 determines a first service apparatus group A1 and a second service apparatus group A2, and pre-allocates the service consuming apparatuses 13a~13c that connect to the service providing apparatus 11 to the first service apparatus group A1 and pre-allocates the service consuming apparatuses 13d~13f to the second service apparatus group A2. At the same time, the processing module 111 of the service providing apparatus 11 also determines a first coordination set X1 and a second coordination set X2. The first coordination set X1 comprises the first service apparatus group A1, and the second coordination set X2 comprises the second service apparatus group A2. It shall be noted beforehand that, the purpose of recording the service apparatus groups A1, A2 into the coordination sets X1, X2 is to coordinate use of time periods of the network channels by the service apparatus groups A1, A2, details of which will be described hereinafter.

Particularly, after the determinations of the groups and sets, the processing module 111 of the service providing apparatus 11 determines a control period schedule 201 of the first coordination set X1 and the second coordination set X2 in a control channel 20, and determines a service period schedule 221 of the first service apparatus group A1 and the second service apparatus group A2 in a first service channel 22. Then, the transceiver 113 of the service providing apparatus 11 transmits a broadcast message 1130, which comprises the control period schedule 201 and the service period schedule 221, to the service consuming apparatuses 13a~13f to notify the service consuming apparatuses 13a~13f of the service apparatus group(s) and the coordination set(s) that they belong to. More specifically, the broadcast message 1130 is configured to notify the service consuming apparatuses 13a~13f that they are allocated into the first service apparatus group A1 and the second service apparatus group A2 respectively, and notify the service consuming apparatuses 13a~13f that the first service apparatus group A1 and the second service apparatus group A2 are included in the first coordination set X1 and the second coordination set X2 respectively. In other words, once the broadcast message is received by the transceiver 133 of each of the service consuming apparatuses 13a~13f from the service providing apparatus 11, the service consuming apparatuses 13a~13f can learn therefrom which service apparatus group(s) and which coordination group(s) they belong to.

On the other hand, when the service consuming apparatuses 13a~13f receive the broadcast message 1130, the control period schedule 201 and the service period schedule 221 are also received as well. Thus, the service providing apparatus 11 and the service consuming apparatuses 13a~13f will be able to proceed with subsequent processes of the usage of channels. Please refer next to FIG. 2B. Specifically, after determination of the groups, the service consuming apparatuses 13a~13c have learned that they belong to the first service apparatus group A1 and also that the first service apparatus group A1 belongs to the first coordination set X1. Hence, according to content of the control period schedule 201 associated with the first coordination set X1 to which they belong, the service consuming apparatuses 13a~13c can transmit a first access request (not shown) to the transceiver 113 of the service providing apparatus 11 in a control period 2010 of the control channel 20 to notify the service providing apparatus 11 of services that they need subsequently in the service channel. Similarly, according to content of the control period schedule 201 associated with the second coordination set X2 to which they belong, the service consuming apparatuses 13d~13f can transmit a second access request (not shown) to the transceiver 113 of the service providing apparatus 11 in a control period 2012 of the control channel 20.

According to the schedule of the first coordination set X1 and the second coordination set X2 in the control channel 20 and content of the service period schedule 221, the first service apparatus group A1 included in the first coordination set X1 and the second service apparatus group A2 included in the second coordination set X2 can consume services in the first service channel 22. To be more specific, once the service consuming apparatuses 13a~13c in the first service apparatus group A1 have transmitted the first access request in the control period 2010 of the control channel 20, they can, according to content of the service period schedule 221, consume a first service resource (not shown) provided by the service module 115 of the service providing apparatus 11 during a first service period 2210. In other words, in the service period schedule 221 determined by the service providing apparatus 11, the schedule of the first service apparatus group A1 and the second service apparatus group A2 in the first service channel 22 has already been recorded; therefore, once the time point scheduled for the first service period 2210 arrives, the service module 115 of the service providing apparatus 11 will provide the first service resource to the first service apparatus group A1 for use by the processing modules 131 of the service consuming apparatuses 13a~13c.

Similarly, once the service consuming apparatuses 13d~13f in the second service apparatus group A2 have transmitted the second access request in the control period 2012 of the control channel 20, they can, according to content of the service period schedule 221, consume a second service resource (not shown) provided by the service module 115 of the service providing apparatus 11 during a second service period 2212. In other words, once the time point scheduled for the second service period 2212 arrives, the service module 115 of the service providing apparatus 11 will provide the second service resource to the second service apparatus group A2 for use by the processing modules 131 of the service consuming apparatuses 13d~13f.

Accordingly, through pre-scheduling by the service providing apparatus 11, the service consuming apparatuses 13a~13c in the first service apparatus group A1 and the service consuming apparatuses 13d~13f in the second service apparatus group A2 can consume network resources in the control channel 20 and the first service channel 221 efficiently.

Figure 3A:
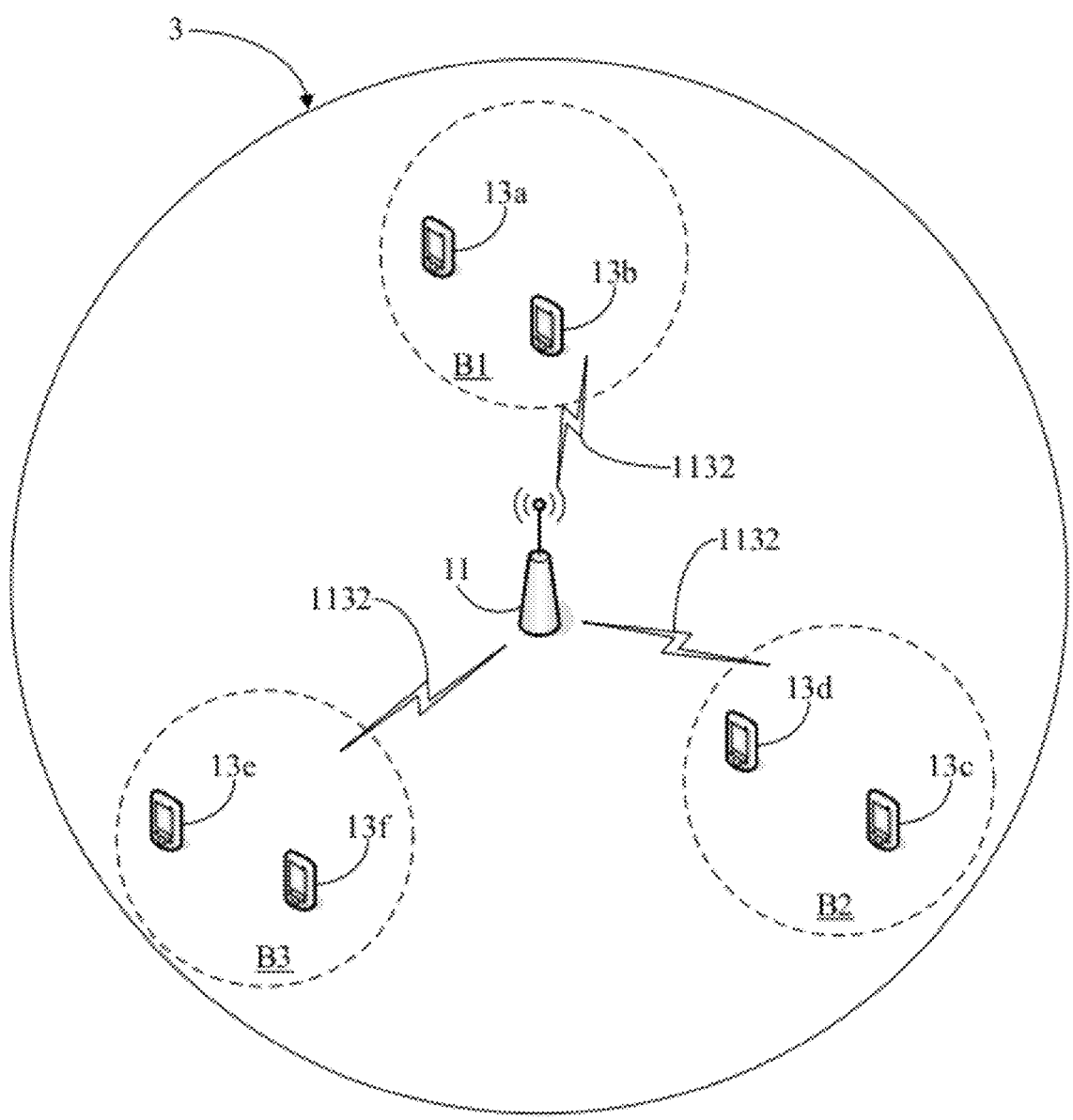
FIG. 3A is a schematic view of a wireless network of a second embodiment of the present invention.
Figure 3B:
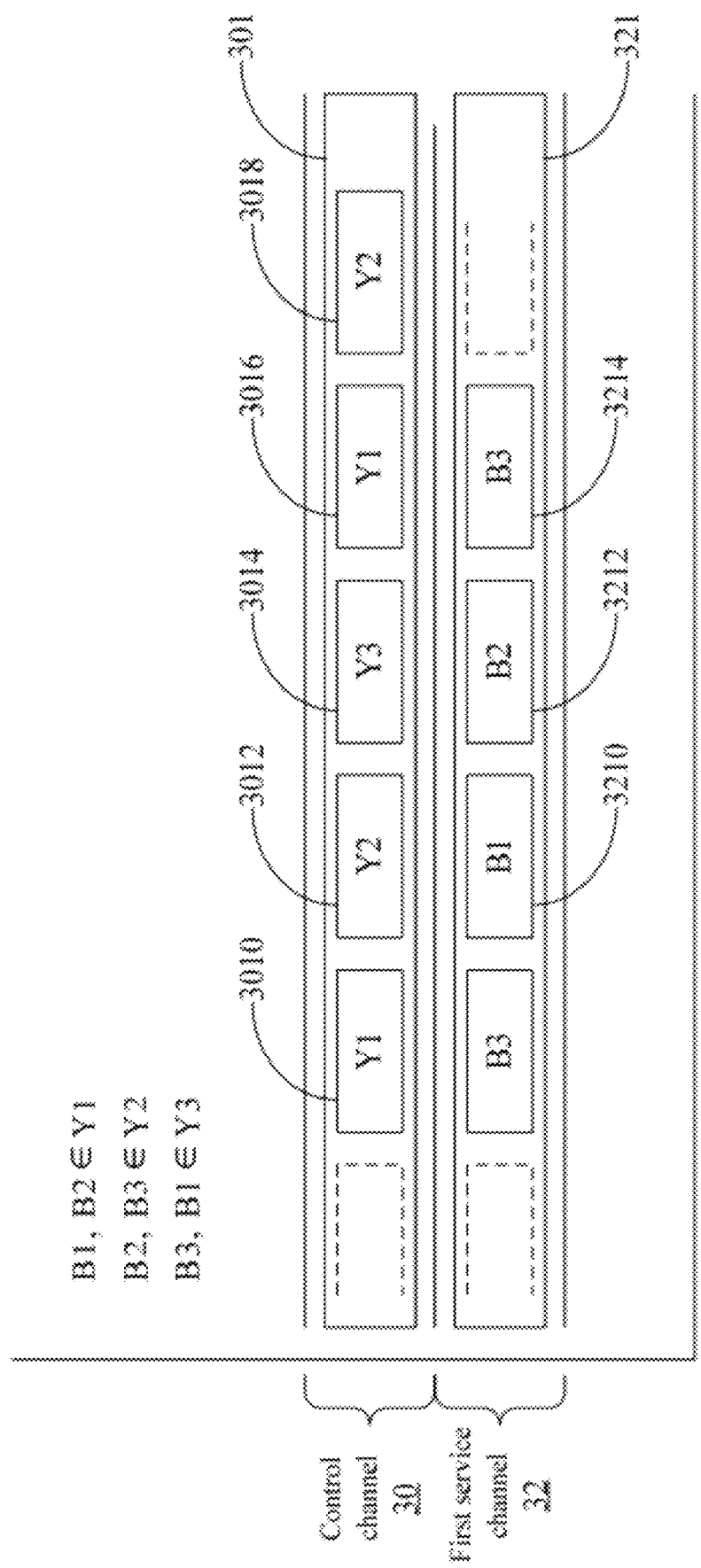
FIG. 3B is a schematic view illustrating usage of channels of the second embodiment of the present invention.

However, the present invention has no limitation on the number of the groups. Accordingly, concepts of the present invention will be further explained with reference to other embodiments thereof. Please refer to FIG. 3A and FIG. 3B together. FIG. 3A is a schematic view of a wireless network 3 of a second embodiment of the present invention. Similar to the first embodiment, the service providing apparatus 11 connects to a plurality of service consuming apparatuses 13a~13f via the wireless network 3. Because hardware architectures of the service providing apparatus 11 and the service consuming apparatuses 13 have already been shown in the first embodiment, no further description of functions of individual modules thereof will be made herein. FIG. 3B is a schematic view illustrating usage of channels of the second embodiment of the present invention.

Initially, the processing module 111 of the service providing apparatus 11 determines a first service apparatus group B1, a second service apparatus group B2 and a third service apparatus group B3, and pre-allocates the service consuming apparatuses 13a~13b that connect to the service providing apparatus 11 to the first service apparatus group B1, pre-allocates the service consuming apparatuses 13c~13d to the second service apparatus group B2, and pre-allocates the service consuming apparatuses 13e~13f to the third service apparatus group B3. At the same time, the processing module 111 of the service providing apparatus 11 also determines a first coordination set Y1, a second coordination set Y2 and a third coordination set Y3. The first coordination set Y1 comprises the first service apparatus group B1 and the second service apparatus group B2, the second coordination set Y2 comprises the second service apparatus group B2 and the third service apparatus group B3, and the third coordination set Y3 comprises the third service apparatus group B3 and the first service apparatus group B1. Likewise, the purpose of recording the service apparatus groups B1, B2, B3 into the coordination sets Y1, Y2, Y3 is to coordinate use of time periods of the network channels by the service apparatus groups B1, B2, B3, details of which will be described hereinafter.

Specifically, after the determinations of the groups and sets, the processing module 111 of the service providing apparatus 11 determines a control period schedule 301 of the first coordination set Y1, the second coordination set Y2 and the third coordination set Y3 in a control channel 30, and determines a service period schedule 321 of the first service apparatus group B1, the second service apparatus group B2 and the third service apparatus group B3 in a first service channel 32. Then, the transceiver 113 of the service providing apparatus 11 transmits a broadcast message 1132, which comprises the control period schedule 301 and the service period schedule 321, to the service consuming apparatuses 13a~13f to notify the service consuming apparatuses 13a~13f of the service apparatus group(s) and the coordination set(s) that they belong to. In more detail, the broadcast message 1132 is configured to notify the service consuming apparatuses 13a~13f that they are allocated into the first service apparatus group B1, the second service apparatus group B2 and the third service apparatus group B3 respectively, and further notify the service consuming apparatuses 13a~13b that the first service apparatus group B1 that they belong to is included in the first coordination set Y1 and the third coordination set Y3, notify the service consuming apparatuses 13c~13d that the second service apparatus group B2 that they belong to is included in the first coordination set Y1 and the second coordination set Y2, and notify the service consuming apparatuses 13e~13f that the third service apparatus group B3 that they belong to is included in the second coordination set Y2 and the third coordination set Y3. In other words, once the broadcast message 1132 is received by the transceiver 133 of each of the service consuming apparatuses 13a~13f from the service providing apparatus 11, the service consuming apparatuses 13a~13f can learn therefrom which service apparatus group(s) and which coordination group(s) they belong to.

On the other hand, when the service consuming apparatuses 13a~13f receive the broadcast message 1132, the control period schedule 301 and the service period schedule 321 are also received as well. Thus, the service providing apparatus 11 and the service consuming apparatuses 13a~13f will be able to proceed with subsequent processes of the usage of channels. Please refer next to FIG. 3B. Specifically, after determination of the groups, the service consuming apparatuses 13a~13b have learned that they belong to the first service apparatus group B1 and also that the first service apparatus group B1 belongs to the first coordination set Y1 and the third coordination set Y3 simultaneously. Hence, according to content of the control period schedule 301 associated with the first coordination set Y1 to which they belong, the service consuming apparatuses 13a~13b can transmit a first access request (not shown) to the transceiver 113 of the service providing apparatus 11 in a control period 3010 of the control channel 30 to notify the service providing apparatus 11 of services that they need subsequently in the service channel. Afterwards, the service consuming apparatuses 13a~13b can, according to content of the service period schedule 321, consume a first service resource (not shown) provided by the service module 115 of the service providing apparatus 11 in a first service period 3210.

It shall be particularly noted that, when there is a large number of groups, utilization factor of the service channel must be adjusted. As a consequence, a case where a group having consumed the service resource in the service channel would be forced back to the control channel might occur. Taking the second embodiment as an example and referring to FIG. 3B, when the first service apparatus group B1 has consumed the first service resource in the first service period 3210, it will return back to the control channel 30 to wait for the next control channel access period. At this moment, the control channel 30 is being accessed by the third service apparatus group B3 of the third coordination set Y3 in a control period 3014. However, because the first service apparatus group B1 is also included in the third coordination set Y3, the first service apparatus group B1 will be able to transmit an access request or just wait in the control period 3014 used by the third coordination set Y3.

Similarly, according to content of the control period schedule 301 associated with the second coordination set Y2 to which they belong, the service consuming apparatuses 13c~13d can transmit a second access request (not shown) to the transceiver 113 of the service providing apparatus 11 in a control period 3012 of the control channel 30 to notify the service providing apparatus 11 of services that they need subsequently in the service channel. Subsequently, the service consuming apparatuses 13c~13d can, according to content of the service period schedule 321, consume a second service resource (not shown) provided by the service module 115 of the service providing apparatus 11 in a second service period 3212. Likewise, when the second service apparatus group B2 has consumed the second service resource in the second service period 3212, it will return back to the control channel 30 to wait for the next control channel access period. At this moment, the control channel 30 is being accessed by the first service apparatus group B1 of the first coordination set Y1 in a control period 3016. However, because the second service apparatus group B2 is also included in the first coordination set Y1, the second service apparatus group B2 will be able to transmit an access request or just wait in the control period 3016 used by the first coordination set Y1.

Also similarly, according to content of the control period schedule 301 associated with the third coordination set Y3 to which they belong, the service consuming apparatuses 13e~13f can transmit a third access request (not shown) to the transceiver 113 of the service providing apparatus 11 in a control period 3014 of the control channel 30 to notify the service providing apparatus 11 of services that they need subsequently in the service channel. Subsequently, the service consuming apparatuses 13e~13f can, according to content of the service period schedule 321, consume a third service resource (not shown) provided by the service module 115 of the service providing apparatus 11 in a third service period 3214. Of course, when the third service apparatus group B3 has consumed the third service resource in the third service period 3214, it will return back to the control channel 30 to wait for the next control channel access period. At this moment, the control channel 30 is being accessed by the second service apparatus group B2 of the second coordination set Y2 in a control period 3018. However, because the third service apparatus group B3 is also included in the second coordination set Y2, the third service apparatus group B3 will be able to transmit an access request or just wait in the control period 3018 used by the second coordination set Y2.

As can be seen from description of the second embodiment, the coordination sets can be used to coordinate the schedule of different apparatus groups in the control channel to effectively improve utilization factor of the channels. Likewise, the present invention has no limitation on the number of service channels; when the service providing apparatus has a plurality of antennas and each service consuming apparatus has only a single antenna, the present invention may also be used to obtain an optimal utilization factor of the channels.

Figure 4A:
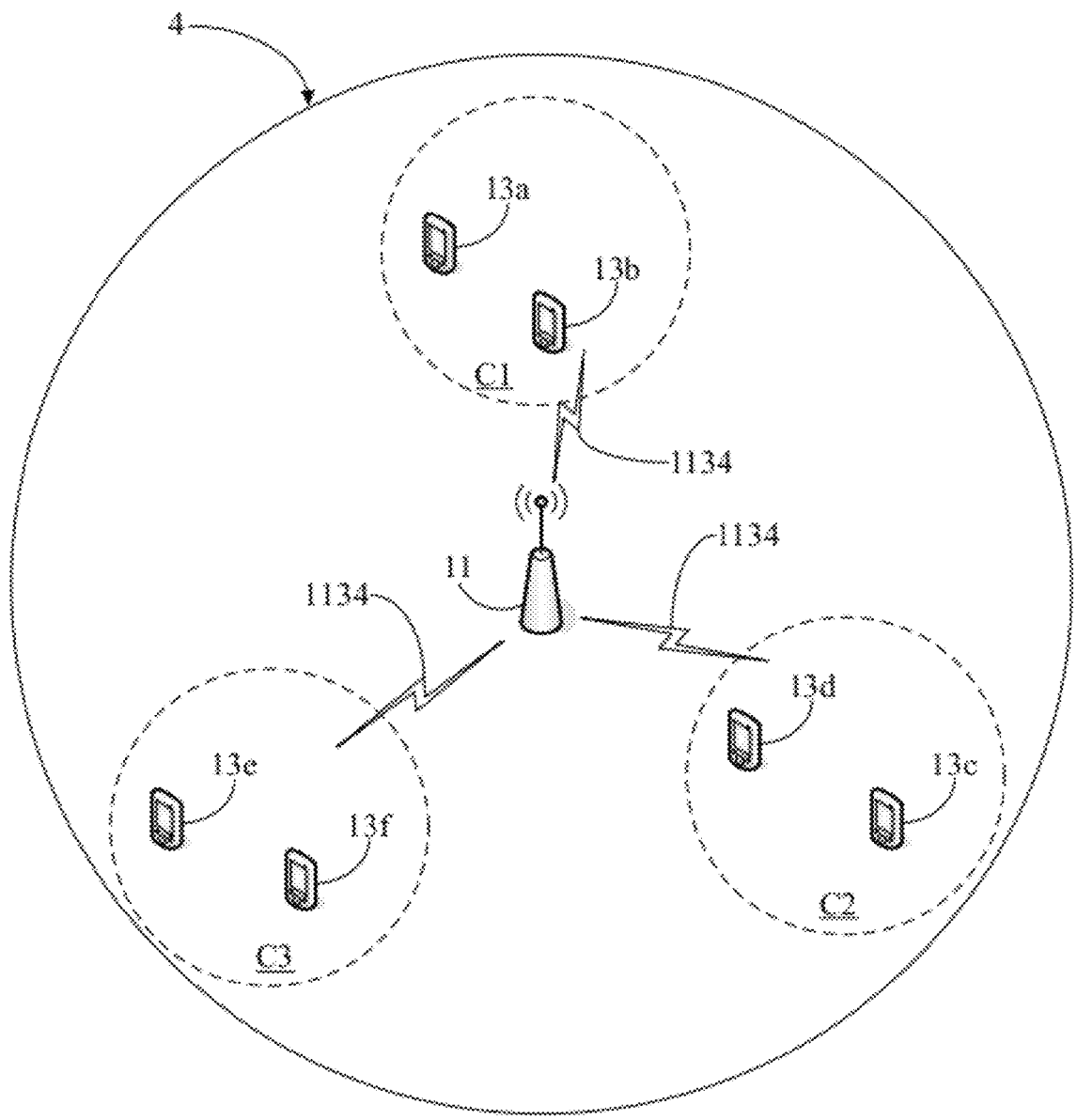
FIG. 4A is a schematic view of a wireless network of a third embodiment of the present invention.
Figure 4B:
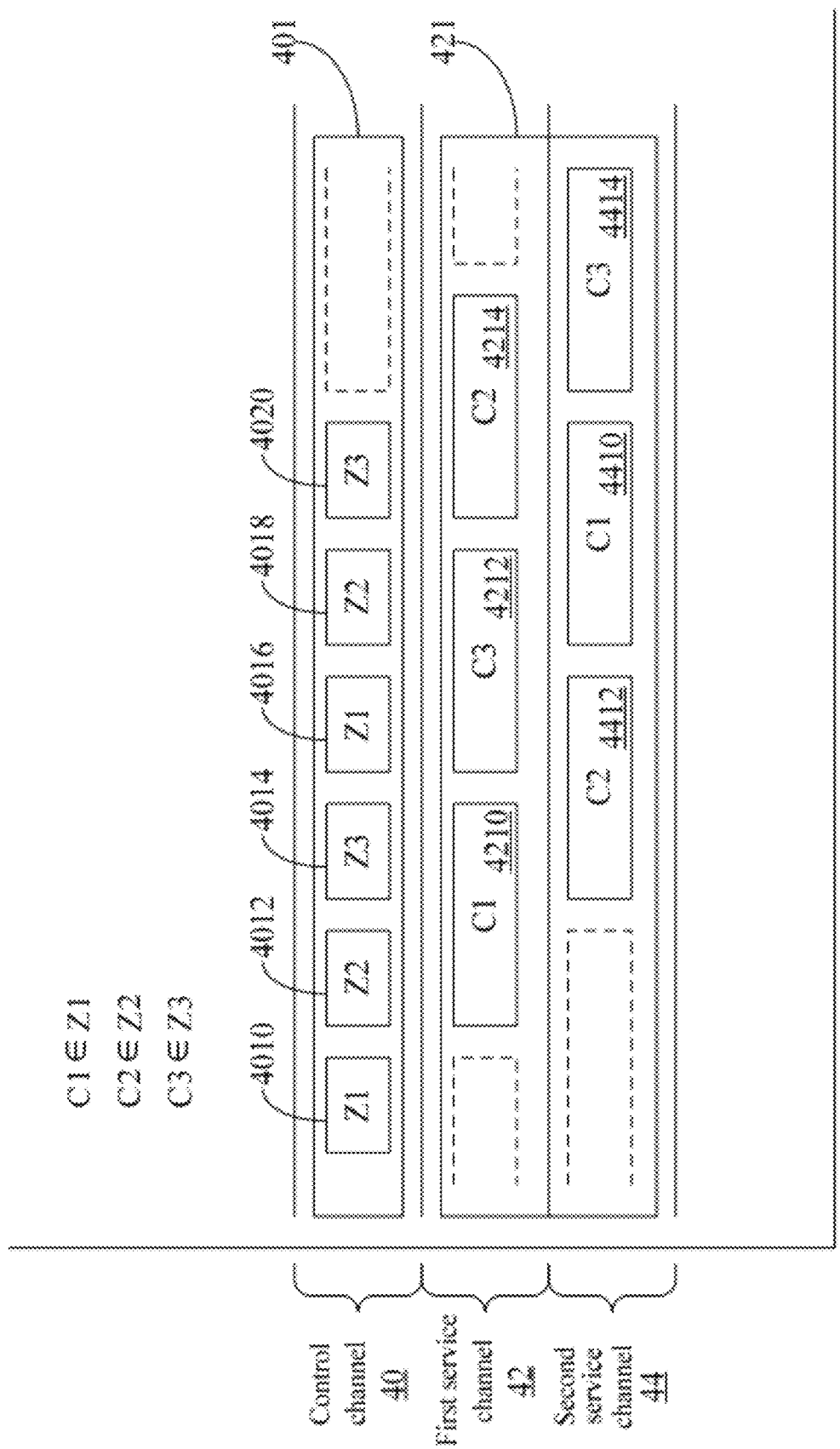
FIG. 4B is a schematic view illustrating usage of channels of the third embodiment of the present invention.

Accordingly, concepts of the present invention will be further explained with reference to a third embodiment thereof. Please refer to FIG. 4A and FIG. 4B together. FIG. 4A is a schematic view of a wireless network 4 of a third embodiment of the present invention. Similar to the first embodiment, the service providing apparatus 11 connects to a plurality of service consuming apparatuses 13a~13f via the wireless network 4. Because hardware architectures of the service providing apparatus 11 and the service consuming apparatuses 13 have already been shown in the first embodiment, no further description of functions of individual modules thereof will be made herein. FIG. 4B is a schematic view illustrating usage of channels of the third embodiment of the present invention.

Initially, the processing module 111 of the service providing apparatus 11 determines a first service apparatus group C1, a second service apparatus group C2 and a third service apparatus group C3, and pre-allocates the service consuming apparatuses 13a~13b that connect to the service providing apparatus 11 to the first service apparatus group C1, pre-allocates the service consuming apparatuses 13c~13d to the second service apparatus group C2, and pre-allocates the service consuming apparatuses 13e~13f to the third service apparatus group C3. At the same time, the processing module 111 of the service providing apparatus 11 also determines a first coordination set Z1, a second coordination set Z2 and a third coordination set Z3. The first coordination set Z1 comprises the first service apparatus group C1, the second coordination set Z2 comprises the second service apparatus group C2, and the third coordination set Z3 comprises the third service apparatus group C3. Likewise, the purpose of recording the service apparatus groups C1, C2, C3 into the coordination sets Z1, Z2, Z3 is to coordinate use of time periods of the network channels by the service apparatus groups C1, C2, C3, details of which will be described hereinafter.

Specifically, after determinations of the groups and the sets, the processing module 111 of the service providing apparatus 11 determines a control period schedule 401 of the first coordination set Z1, the second coordination set Z2 and the third coordination set Z3 in a control channel 40, and determines a service period schedule 421 of the first service apparatus group C1, the second service apparatus group C2 and the third service apparatus group C3 in a first service channel 42 and a second service channel 44. Then, the transceiver 113 of the service providing apparatus 11 transmits a broadcast message 1134, which comprises the control period schedule 401 and the service period schedule 421, to the service consuming apparatuses 13a~13f to notify the service consuming apparatuses 13a~13f of the service apparatus group(s) and the coordination set(s) that they belong to. In more detail, the broadcast message 1134 is configured to notify the service consuming apparatuses 13a~13f that they are allocated into the first service apparatus group C1, the second service apparatus group C2 and the third service apparatus group C3 respectively, and further notify the service consuming apparatuses 13a~13f that the first service apparatus group C1, the second service apparatus group C2 and the third service apparatus group C3 that they belong to are included in the first coordination set Z1, the second coordination set Z2 and the third coordination set Z3 respectively. In other words, once the broadcast message 1134 is received by the transceiver 133 of each of the service consuming apparatuses 13a~13f from the service providing apparatus 11, the service consuming apparatuses 13a~13f can learn therefrom which service apparatus group(s) and which coordination group(s) they belong to.

On the other hand, when the service consuming apparatuses 13a~13f receive the broadcast message 1134, the control period schedule 401 and the service period schedule 421 are also received as well. Thus, the service providing apparatus 11 and the service consuming apparatuses 13a~13f will be able to proceed with subsequent processes of the usages of channels. Please refer next to FIG. 4B. Specifically, after determination of the groups, the service consuming apparatuses 13a~13b have learned that they belong to the first service apparatus group C1 and also that the first service apparatus group C1 belongs to the first coordination set Z1. Hence, according to content of the control period schedule 401 associated with the first coordination set Z1 to which they belong, the service consuming apparatuses 13a~13b can transmit a first access request (not shown) to the transceiver 113 of the service providing apparatus 11 in a control period 4010 of the control channel 40 to notify the service providing apparatus 11 of services that they need subsequently in the service channels. Subsequently, the service consuming apparatuses 13a~13b can, according to content of the service period schedule 421, consume a first service resource (not shown) provided by the service module 115 of the service providing apparatus 11 in a first service period 4210 of the first service channel 42.

It shall be particularly noted that, when the service providing apparatus has a plurality of service channels, utilization factors of the service channels must be adjusted to obtain the maximum utilization factor of the service channels as a whole. Taking the third embodiment as an example and referring to FIG. 4B, when the first service apparatus group C1 has consumed the first service resource in the first service period 4210 of the first service channel 42, it will return back to the control channel 40 for accessing in the next control channel access period, i.e., return back to a control channel period 4016. Then, when completing the accessing in the control channel 40, the first service apparatus group C1 will go back to the service channel to consume the services. However, because, at this moment, the first service channel 42 is being occupied by the third service apparatus group C3 in a second service channel period 4212 of the first service channel 42, the first service apparatus group C1 will be scheduled to consume the services in the first service channel period 4410 of the second service channel 44.

Similarly, the service consuming apparatuses 13c~13d may learn from the broadcast message 1134 that they belong to the second service apparatus group C2 and also that the second service apparatus group C2 belongs to the second coordination set Z2. Hence, according to content of the control period schedule 401 associated with the second coordination set Z2 to which they belong, the service consuming apparatuses 13c~13d can transmit a second access request (not shown) to the transceiver 113 of the service providing apparatus 11 in a control period 4012 of the control channel 40 to notify the service providing apparatus 11 of services that they need subsequently in the service channels. Subsequently, the service consuming apparatuses 13c~13d can, according to content of the service period schedule 421, consume a second service resource (not shown) provided by the service module 115 of the service providing apparatus 11 in a second service period 4412 of the second service channel 44.

Likewise, when the second service apparatus group C2 has consumed the second service resource in the second service period 4412 of the second service channel 44, it will return back to the control channel 40 for accessing in the next control channel access period, i.e., return back to a control channel period 4018. Then, when completing the accessing in the control channel 40, the second service apparatus group C2 will go back to the service channel to consume the services. However, because, at this moment, the second service channel 44 is being occupied by the first service apparatus group C1 in the service channel period 4410, the second service apparatus group C2 will be scheduled to consume the services in a service channel period 4214 of the first service channel 42.

Similarly, the service consuming apparatuses 13e~13f may learn from the broadcast message 1134 that they belong to the third service apparatus group C3 and also that the third service apparatus group C3 belongs to the third coordination set Z3. Hence, according to content of the control period schedule 401 associated with the third coordination set Z3 to which they belong, the service consuming apparatuses 13e~13f can transmit a third access request (not shown) to the transceiver 113 of the service providing apparatus 11 in a control period 4014 of the control channel 40 to notify the service providing apparatus 11 of services that they need subsequently in the service channels. Subsequently, the service consuming apparatuses 13e~13f can, according to content of the service period schedule 421, consume a third service resource (not shown) provided by the service module 115 of the service providing apparatus 11 in the second service period 4212 of the first service channel 42.

Likewise, when the third service apparatus group C3 has consumed the third service resource in the second service period 4212 of the first service channel 42, it will return back to the control channel 40 for accessing in the next control channel access period, i.e., return back to a control channel period 4020. Then, when completing the accessing in the control channel 40, the third service apparatus group C3 will go back to the service channel to consume the services. However, because, at this moment, the first service channel 42 is being occupied by the second service apparatus group C2 in the service channel period 4214, the third service apparatus group C3 will be scheduled to consume the services in a service channel period 4414 of the second service channel 44.

As can be seen from the third embodiment, when the service providing apparatus has a plurality of antennas and each service consuming apparatus has only a single antenna, the present invention may also be used to obtain an optimal utilization factor of the channels.

Figure 5A:
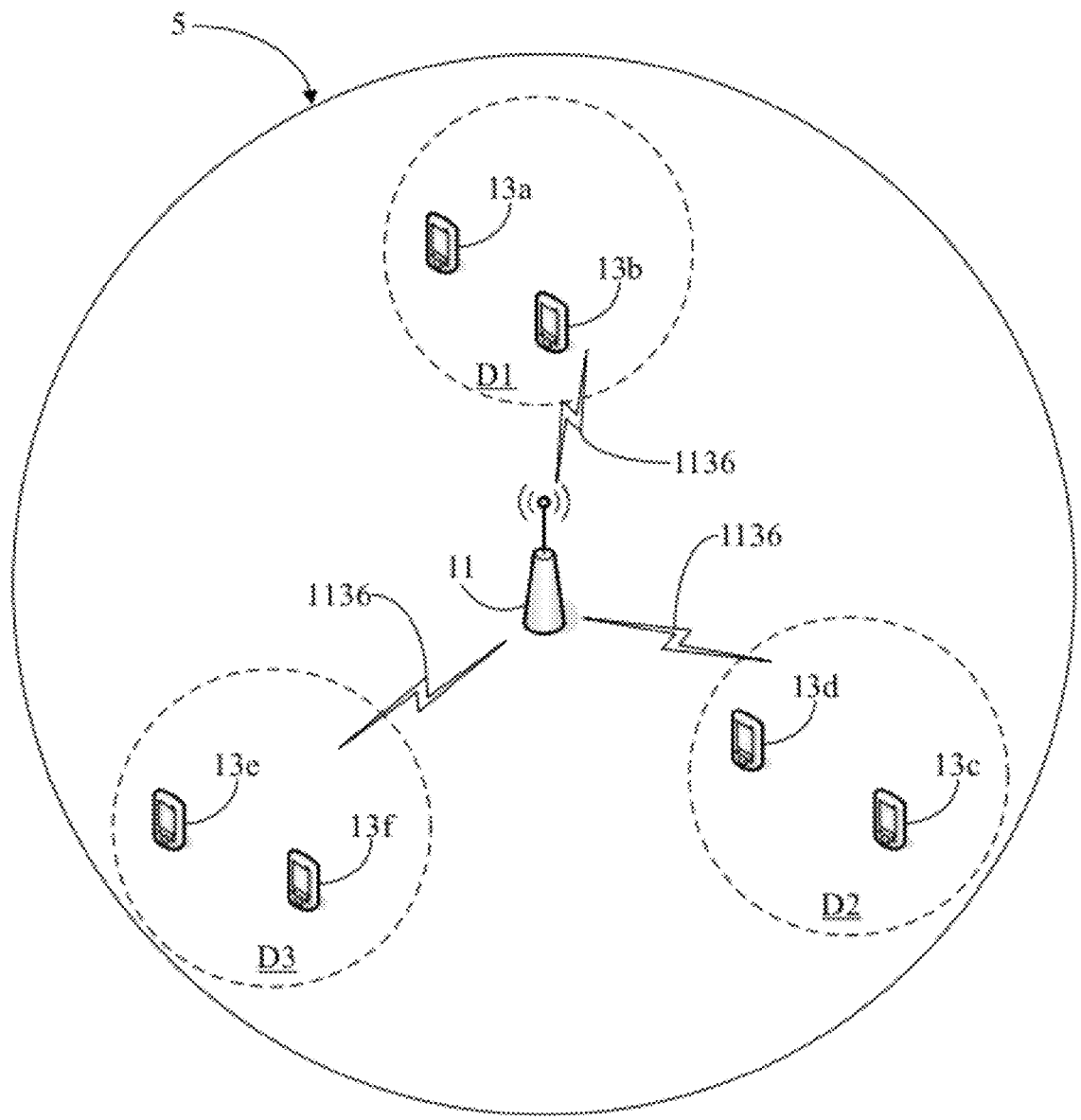
FIG. 5A is a schematic view of a wireless network of a fourth embodiment of the present invention.
Figure 5B:
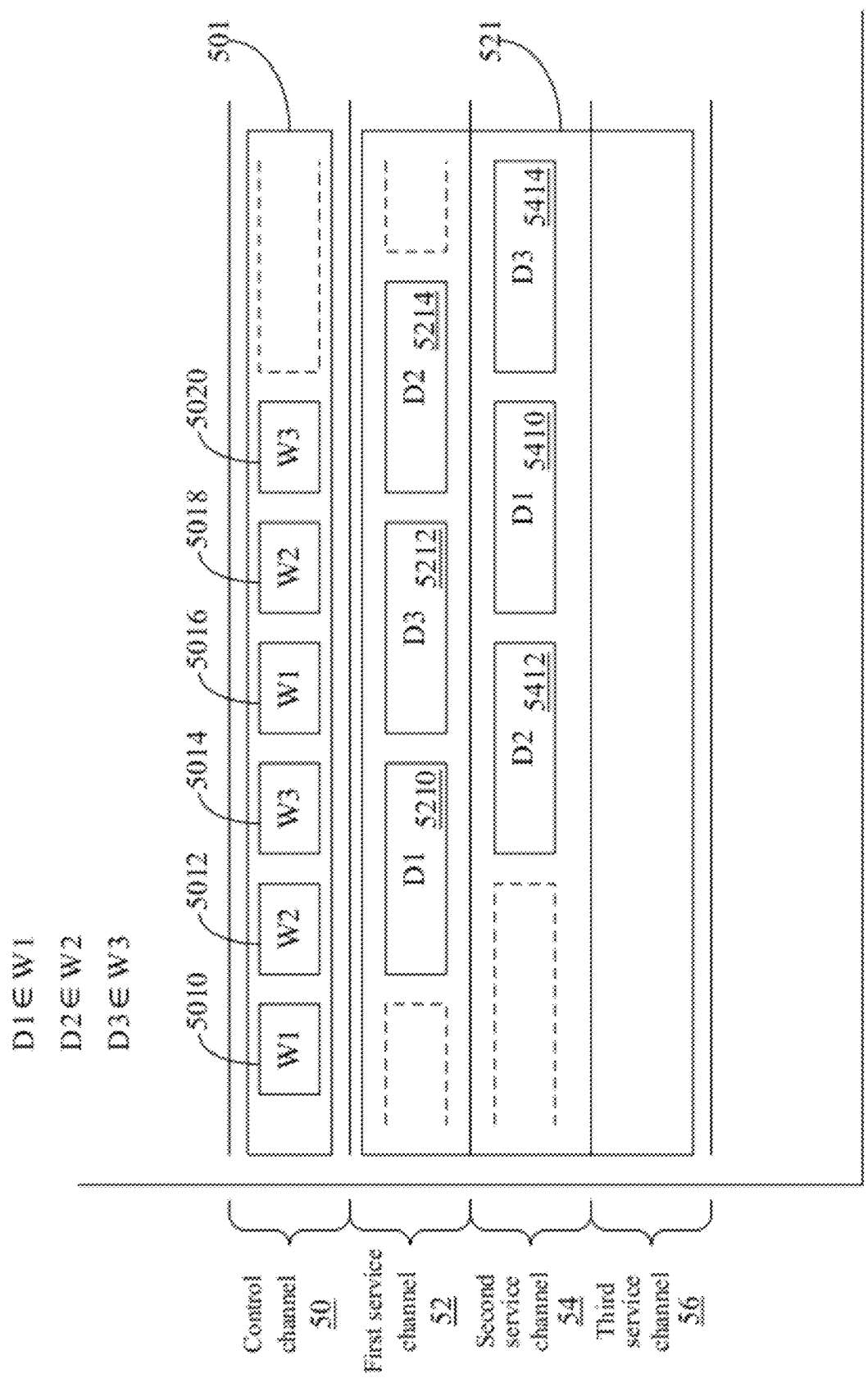
FIG. 5B is a schematic view illustrating usage of channels of the fourth embodiment of the present invention.

Referring next to FIG. 5A and FIG. 5B, a fourth embodiment of the present invention is shown therein to describe a scenario where the number of groups is equal to the number of service channels. FIG. 5A is a schematic view of a wireless network 5 of the fourth embodiment of the present invention. Similar to the first embodiment, the service providing apparatus 11 connects to a plurality of service consuming apparatuses 13a~13f via the wireless network 5. Because hardware architectures of the service providing apparatus 11 and the service consuming apparatuses 13 have already been shown in the first embodiment, no further description of functions of individual modules thereof will be made herein. FIG. 5B is a schematic view illustrating usage of channels of the fourth embodiment of the present invention.

Initially, the processing module 111 of the service providing apparatus 11 determines a first service apparatus group D1, a second service apparatus group D2 and a third service apparatus group D3, and pre-allocates the service consuming apparatuses 13a~13b that connect to the service providing apparatus 11 to the first service apparatus group D1, pre-allocates the service consuming apparatuses 13c~13d to the second service apparatus group D2, and pre-allocates the service consuming apparatuses 13e~13f to the third service apparatus group D3. At the same time, the processing module 111 of the service providing apparatus 11 also determines a first coordination set W1, a second coordination set W2 and a third coordination set W3. The first coordination set W1 comprises the first service apparatus group D1, the second coordination set W2 comprises the second service apparatus group D2, and the third coordination set W3 comprises the third service apparatus group D3. Likewise, the purpose of recording the service apparatus groups D1, D2, D3 into the coordination sets W1, W2, W3 is to coordinate use of time periods of the network channels by the service apparatus groups D1, D2, D3, details of which will be described hereinafter.

Specifically, after determinations of the groups and sets, the processing module 111 of the service providing apparatus 11 determines a control period schedule 501 of the first coordination set W1, the second coordination set W2 and the third coordination set W3 in a control channel 50, and determines a service period schedule 521 of the first service apparatus group D1, the second service apparatus group D2 and the third service apparatus group D3 in a first service channel 52, a second service channel 54 and a third service channel 56. Then, the transceiver 113 of the service providing apparatus 11 transmits a broadcast message 1136, which comprises the control period schedule 501 and the service period schedule 521, to the service consuming apparatuses 13a~13f to notify the service consuming apparatuses 13a~13f of the service apparatus group(s) and the coordination set(s) that they belong to. In more detail, the broadcast message 1136 is configured to notify the service consuming apparatuses 13a~13f that they are allocated into the first service apparatus group D1, the second service apparatus group D2 and the third service apparatus group D3 respectively, and further notify the service consuming apparatuses 13a~13f that the first service apparatus group D1, the second service apparatus group D2 and the third service apparatus group D3 that they belong to are included in the first coordination set W1, the second coordination set W2 and the third coordination set W3 respectively. In other words, once the broadcast message 1136 is received by the transceiver 133 of each of the service consuming apparatuses 13a~13f from the service providing apparatus 11, the service consuming apparatuses 13a~13f can learn therefrom which service apparatus group(s) and which coordination group(s) they belong to.

On the other hand, when the service consuming apparatuses 13a~13f receive the broadcast message 1136, the control period schedule 501 and the service period schedule 521 are also received as well. Thus, the service providing apparatus 11 and the service consuming apparatuses 13a~13f will be able to proceed with subsequent processes of the usages of channels. Please refer next to FIG. 5B. Specifically, after determination of the groups, the service consuming apparatuses 13a~13b have learned that they belong to the first service apparatus group D1 and also that the first service apparatus group D1 belongs to the first coordination set W1. Hence, according to content of the control period schedule 501 associated with the first coordination set W1 to which they belong, the service consuming apparatuses 13a~13b can transmit a first access request (not shown) to the transceiver 113 of the service providing apparatus 11 in a control period 5010 of the control channel 50 to notify the service providing apparatus 11 of services that they need subsequently in the service channels. Subsequently, the service consuming apparatuses 13a~13b can, according to content of the service period schedule 421, consume a first service resource (not shown) provided by the service module 115 of the service providing apparatus 11 in a first service period 5210 of the first service channel 52.

It shall be particularly noted that, when the service providing apparatus has a plurality of service channels, utilization factors of the service channels must be adjusted to obtain the maximum utilization factor of the service channels as a whole. Taking the fourth embodiment as an example and referring to FIG. 5B, when the first service apparatus group D1 has consumed the first service resource in the first service period 5210 of the first service channel 52, it will return back to the control channel 50 for accessing in the next control channel access period, i.e., return back to a control channel period 5016. Then, when completing the accessing in the control channel 50, the first service apparatus group D1 will go back to the service channel to consume the services. However, because, at this moment, the first service channel 52 is being occupied by the third service apparatus group D3 in a second service channel period 5212 of the first service channel 52, the first service apparatus group D1 will be scheduled to consume the services in the first service channel period 5410 of the second service channel 54.

Similarly, the service consuming apparatuses 13c~13d may learn from the broadcast message 1136 that they belong to the second service apparatus group D2 and also that the second service apparatus group D2 belongs to the second coordination set W2. Hence, according to content of the control period schedule 501 associated with the second coordination set W2 to which they belong, the service consuming apparatuses 13c~13d can transmit a second access request (not shown) to the transceiver 113 of the service providing apparatus 11 in a control period 5012 of the control channel 50 to notify the service providing apparatus 11 of services that they need subsequently in the service channels. Subsequently, the service consuming apparatuses 13c~13d can, according to content of the service period schedule 521, consume a second service resource (not shown) provided by the service module 115 of the service providing apparatus 11 in a second service period 5412 of the second service channel 54.

Likewise, when the second service apparatus group D2 has consumed the second service resource in the second service period 5412 of the second service channel 54, it will return back to the control channel 50 for accessing in the next control channel access period, i.e., return back to a control channel period 5018. Then, when completing the accessing in the control channel 50, the second service apparatus group D2 will go back to the service channel to consume the services. However, because, at this moment, the second service channel 54 is being occupied by the first service apparatus group D1 in the service channel period 5410, the second service apparatus group D2 will be scheduled to consume the services in a service channel period 5214 of the first service channel 52.

Similarly, the service consuming apparatuses 13e~13f may learn from the broadcast message 1136 that they belong to the third service apparatus group D3 and also that the third service apparatus group D3 belongs to the third coordination set W3. Hence, according to content of the control period schedule 501 associated with the third coordination set W3 to which they belong, the service consuming apparatuses 13e~13f can transmit a third access request (not shown) to the transceiver 113 of the service providing apparatus 11 in a control period 5014 of the control channel 50 to notify the service providing apparatus 11 of services that they need subsequently in the service channels. Subsequently, the service consuming apparatuses 13e~13f can, according to content of the service period schedule 521, consume a third service resource (not shown) provided by the service module 115 of the service providing apparatus 11 in the second service period 5212 of the first service channel 52.

Likewise, when the third service apparatus group D3 has consumed the third service resource in the second service period 5212 of the first service channel 52, it will return back to the control channel 50 for accessing in the next control channel access period, i.e., return back to a control channel period 5020. Then, when completing the accessing in the control channel 50, the third service apparatus group D3 will go back to the service channel to consume the services. However, because, at this moment, the first service channel 52 is being occupied by the second service apparatus group D2 in the service channel period 5214, the third service apparatus group D3 will be scheduled to consume the services in a service channel period 5414 of the second service channel 54.

As can be seen from the fourth embodiment, when the number of service channels is equal to the number of service apparatus groups, an idle service channel(s) (e.g., the third service channel 56) will arise. Nevertheless, in such a case, albeit of the unused service channel(s), the present invention still presents a channel utilization factor that is significantly higher than the prior art.

Figure 6:
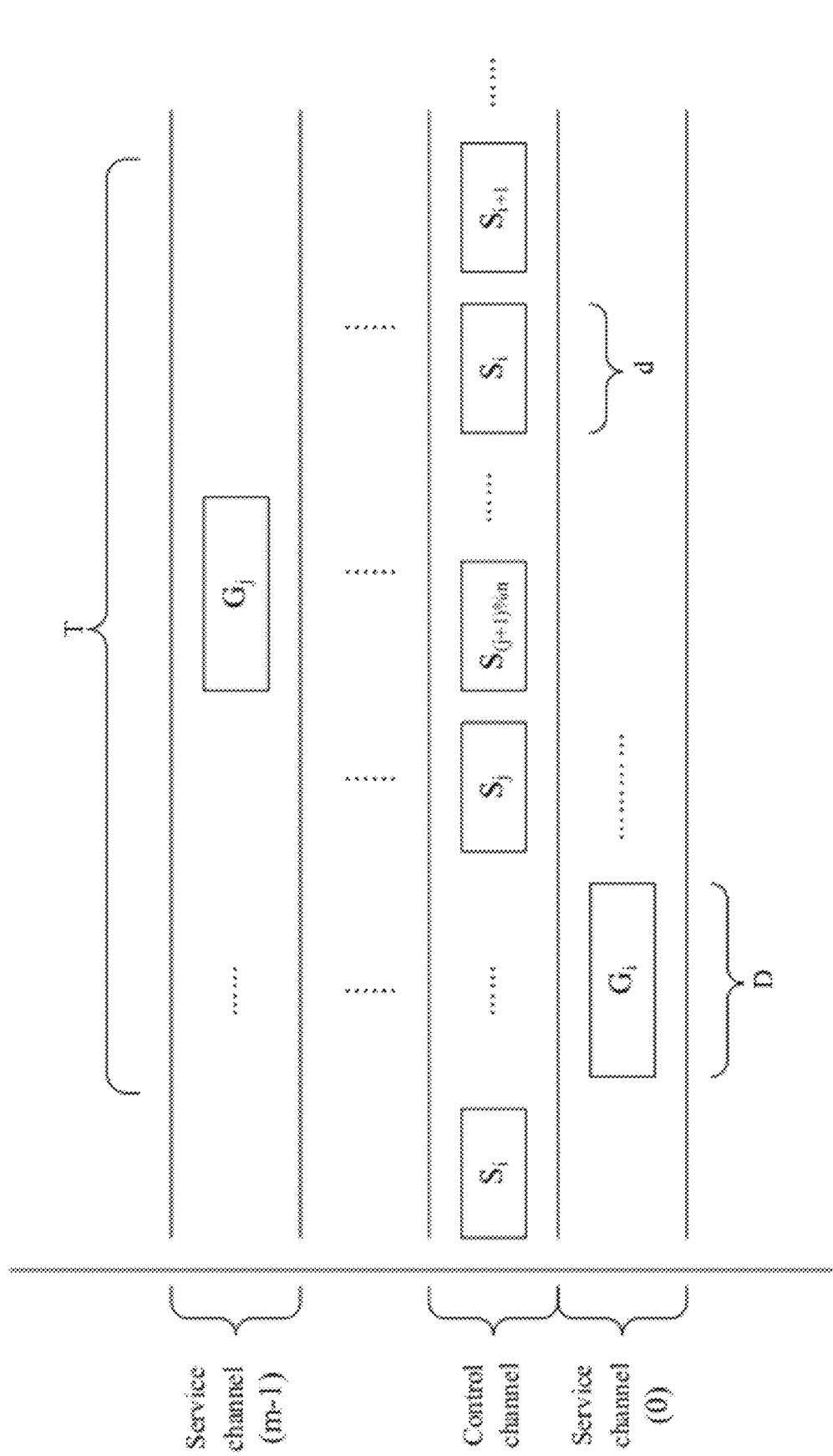
FIG. 6 is a schematic view illustrating usage of channels of a fifth embodiment of the present invention.

Referring next to FIG. 6, a fifth embodiment of the present invention is shown therein to describe one of the scheduling schemes used in the present invention. Here, it shall be particularly noted beforehand that, m represents the number of service channels, n represents the number of service apparatus groups, $G_i$ represents the $i^{th}$ service apparatus group, $S_i$ represents the $i^{th}$ coordination set, T represents the whole cycle, d represents a control period of a coordination set in the control channel, and D represents a service period of a service apparatus group in a service channel.

In the fifth embodiment, the following scheme is used to schedule the service apparatus groups in the control channel and the service channels: $S_j = \{G_j, G_{(j+1)\%n}, \ldots, G_{(j+n-m-1)\%n}\}$, and if m>n, then D=T/n; if m=n, then D=T*(m−1)/n; and if m<n, then D=T*m/n. By using this scheduling scheme, the utilization efficiency of the service channels in various periods can be improved remarkably due to adjustability of the service channels as a whole, and the first to the fourth embodiments described above can be accomplished.

The aforesaid embodiments may be applied to a Telematics network, in which case the service providing apparatus 11 may be an RSU and each of the service consuming apparatuses 13 may be an OBU. When the service providing apparatus 11 is an RSU and each of the service consuming apparatuses 13 is an OBU, each of the wireless networks 1 to 5 is a Vehicle-to-Roadside communication network and the network technology adopted is the Wireless Access for Vehicular Environment (WAVE) technology and/or the Dedicated Short Range Communication (DSRC) technology.

Figure 7:
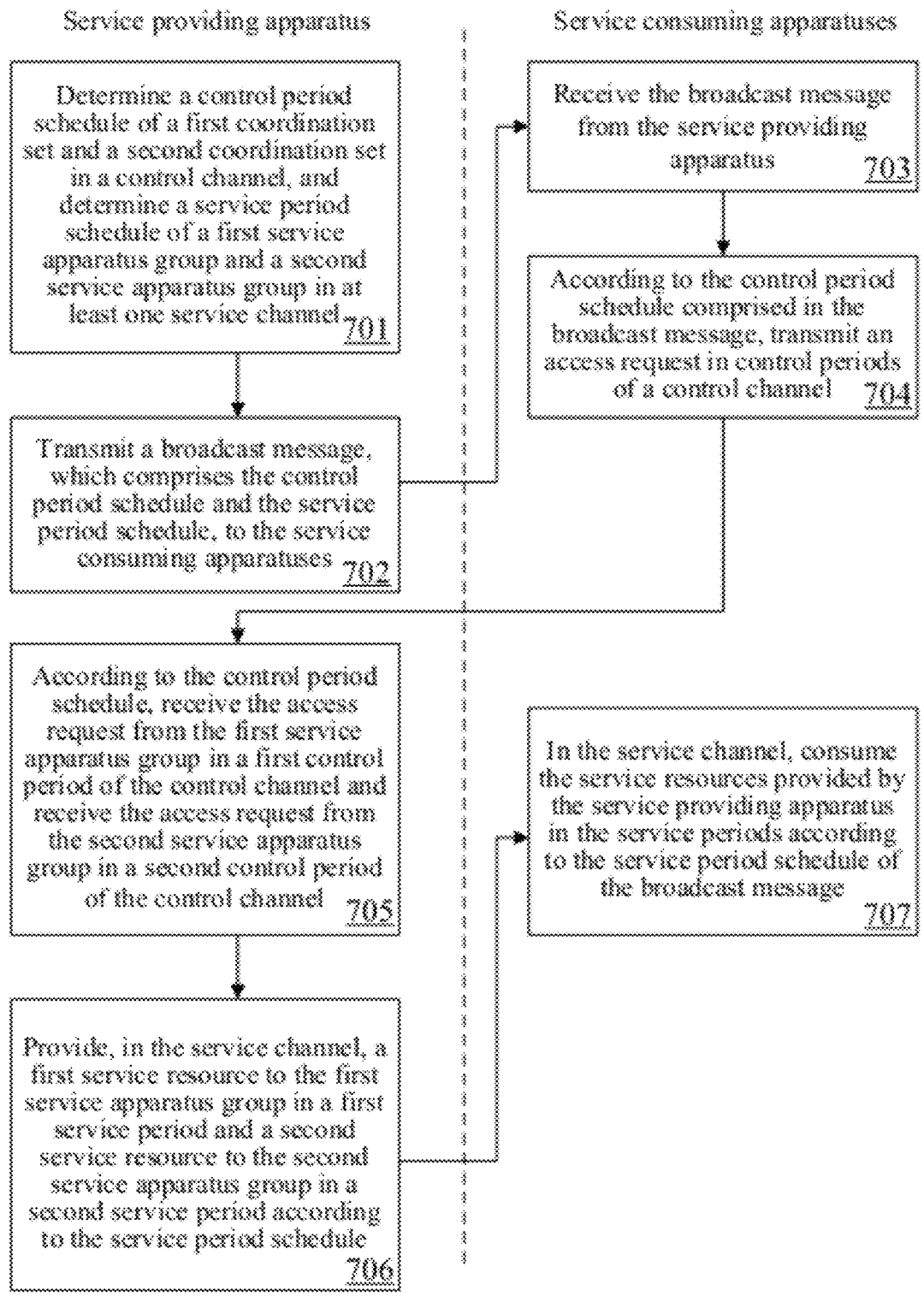
FIG. 7 is a flowchart of a service transmitting method of a sixth embodiment of the present invention.

A sixth embodiment of the present invention is a service transmitting method, a flowchart of which is shown in FIG. 7. The service transmitting method of the sixth embodiment is adapted for a service providing apparatus and a service consuming apparatus (e.g., the service providing apparatus 11 and any of the service consuming apparatuses 13 described in the previous embodiments). The service providing apparatus connects to a plurality of service consuming apparatuses via a wireless network. Steps of the service transmitting method of the sixth embodiment will be detailed as follows.

Step 701 is executed to enable the service providing apparatus to determine a control period schedule of a first coordination set and a second coordination set in a control channel, and determine a service period schedule of a first service apparatus group and a second service apparatus group in at least one service channel. The first coordination set at least comprises the first service apparatus group, and the second coordination set at least comprises the second service apparatus group. Then, step 702 is executed to enable the service providing apparatus to transmit a broadcast message, which comprises the control period schedule and the service period schedule, to the service consuming apparatuses. The broadcast message is configured to notify the service consuming apparatuses that they are allocated into the first service apparatus group and the second service apparatus group respectively, to notify the service consuming apparatuses of the first service apparatus group that they are included in the first coordination set, and to notify the service consuming apparatuses of the second service apparatus group that they are included in the second coordination set. Next, step 703 is executed to enable the service consuming apparatuses to receive the broadcast message from the service providing apparatus, obtain therefrom the control period schedule and the service period schedule, and learn therefrom allocations of the service consuming apparatuses in the first service apparatus group and the second service apparatus group. Thus, the service consuming apparatuses allocated into the first service apparatus group can learn that they are included in the first coordination set, and the service consuming apparatuses allocated into the second service apparatus group can learn that they are included in the second coordination set.

Thereafter, step 704 is executed to enable the service consuming apparatuses to, according to the control period schedule comprised in the broadcast message, transmit access requests in control periods of a control channel respectively. The control period schedule records a schedule of the coordinate sets in the control channel. Step 705 is executed to enable the service providing apparatus to, according to the control period schedule, receive the access requests from the first service apparatus group included in the first coordination set in a first control period of the control channel, and to receive the access request from the second service apparatus group included in the second coordination set in a second control period of the control channel.

Next, step 706 is executed to enable the service providing apparatus to provide, in the at least one service channel, a first service resource to the first service apparatus group in a first service period and to provide a second service resource to the second service apparatus group in a second service period according to the service period schedule. Step 707 is executed to enable the service consuming apparatuses to, in at least one service channel, consume the service resources provided by the service providing apparatus in the service periods according to the service period schedule of the broadcast message. In more detail, the service consuming apparatuses belonging to the first service apparatus group consume the first service resource in the first service period, and the service consuming apparatuses belonging to the second service apparatus group consume the second service resource in the second service period. The service period schedule records a schedule of the service apparatus groups of the service consuming apparatuses in the service channel.

Figure 8:
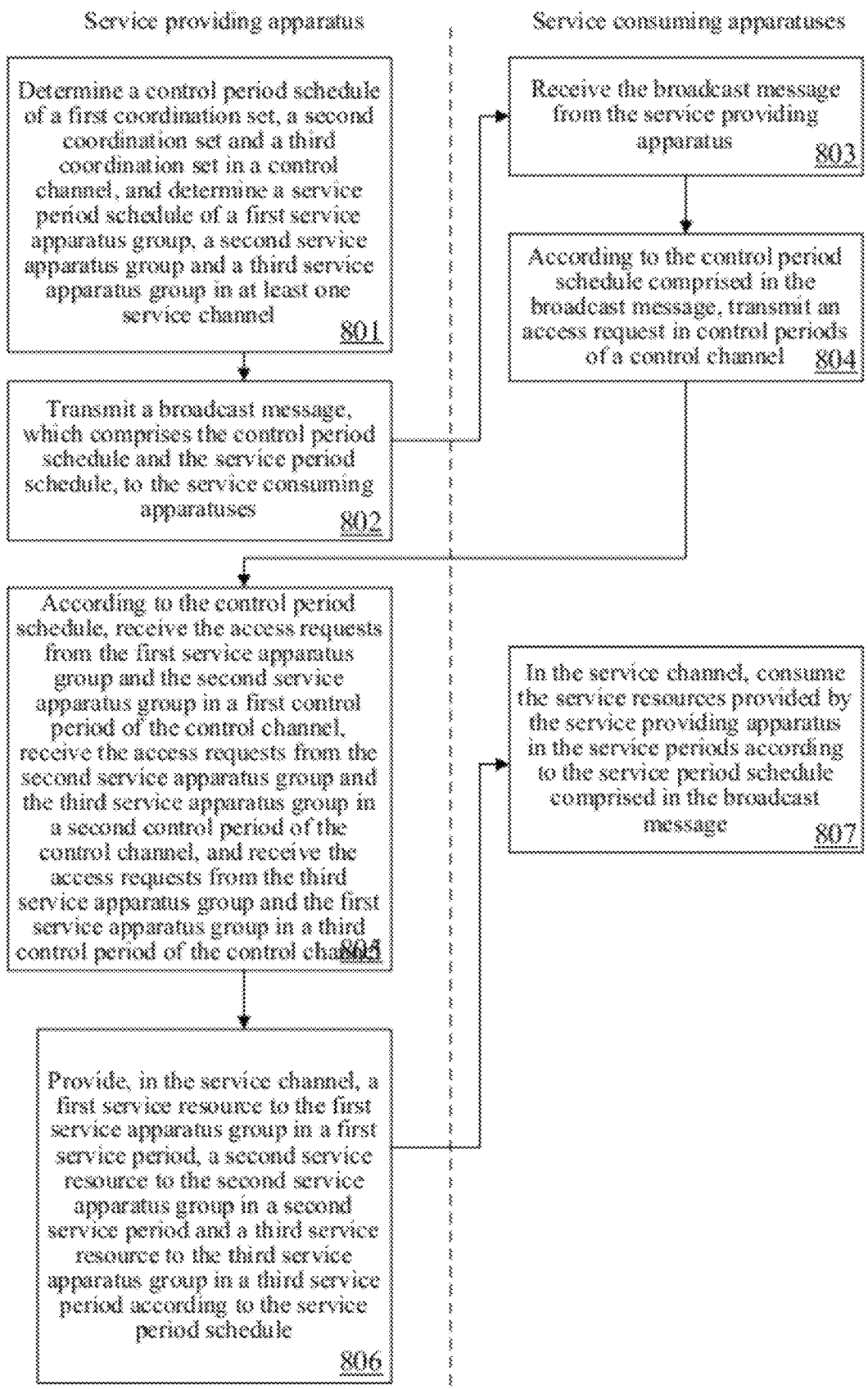
FIG. 8 is a flowchart of a service transmitting method of a seventh embodiment of the present invention.

A seventh embodiment of the present invention is another service transmitting method, a flowchart of which is shown in FIG. 8. The service transmitting method of the seventh embodiment is also adapted for a service providing apparatus and a service consuming apparatus (e.g., the service providing apparatus 11 and any of the service consuming apparatuses 13 described in the previous embodiments). The service providing apparatus connects to a plurality of service consuming apparatuses via a wireless network. Steps of the service transmitting method of the seventh embodiment will be detailed as follows.

Step 801 is executed to enable the service providing apparatus to determine a control period schedule of a first coordination set, a second coordination set and a third coordination set in a control channel, and determine a service period schedule of a first service apparatus group, a second service apparatus group and a third service apparatus group in at least one service channel. The first coordination set at least comprises the first service apparatus group and the second service apparatus group, the second coordination set at least comprises the second service apparatus group and the third service apparatus group, and the third coordination set at least comprises the third service apparatus group and the first service apparatus group. Then, step 802 is executed to enable the service providing apparatus to transmit a broadcast message, which comprises the control period schedule and the service period schedule, to the service consuming apparatuses. The broadcast message is configured to notify the service consuming apparatuses that they are allocated into the first service apparatus group, the second service apparatus group and the third service apparatus group respectively, to notify the service consuming apparatuses of the first service apparatus group that they are included in the first coordination set and the third coordination set, to notify the service consuming apparatuses of the second service apparatus group that they are included in the first coordination set and the second coordination set, and to notify the service consuming apparatuses of the third service apparatus group that they are included in the second coordination set and the third coordination set. Next, step 803 is executed to enable the service consuming apparatuses to receive the broadcast message from the service providing apparatus, obtain therefrom the control period schedule and the service period schedule, and learn therefrom allocations of the service consuming apparatuses in the first service apparatus group, the second service apparatus group and the third service apparatus group. Thus, the service consuming apparatuses allocated into the first service apparatus group can learn that they are included in the first coordination set and the third coordination set, the service consuming apparatuses allocated into the second service apparatus group can learn that they are included in the first coordination set and the second coordination set, and the service consuming apparatuses allocated into the third service apparatus group can learn that they are included in the second coordination set and the third coordination set.

Thereafter, step 804 is executed to enable the service consuming apparatuses to, according to the control period schedule comprised in the broadcast message, transmit access requests in control periods of a control channel respectively. The control period schedule records a schedule of the coordinate sets in the control channel. Step 805 is executed to enable the service providing apparatus to, according to the control period schedule, receive the access requests from the first service apparatus group and the second service apparatus group included in the first coordination set in a first control period of the control channel, to receive the access requests from the second service apparatus group and the third service apparatus group included in the second coordination set in a second control period of the control channel, and to receive the access requests from the third service apparatus group and the first service apparatus group included in the third coordination set in a third control period of the control channel.

Next, step 806 is executed to enable the service providing apparatus to provide, in the at least one service channel, a first service resource to the first service apparatus group in a first service period, a second service resource to the second service apparatus group in a second service period and a third service resource to the third service apparatus group in a third service period according to the service period schedule. Step 807 is executed to enable the service consuming apparatuses to, in at least one service channel, consume the service resources provided by the service providing apparatus in the service periods according to the service period schedule comprised in the broadcast message. In more detail, the service consuming apparatuses belonging to the first service apparatus group consume the first service resource in the first service period, the service consuming apparatuses belonging to the second service apparatus group consume the second service resource in the second service period, and the service consuming apparatuses belonging to the third service apparatus group consume the third service resource in the third service period. The service period schedule records a schedule of the service apparatus groups of the service consuming apparatuses in the service channel.

Figure 9:
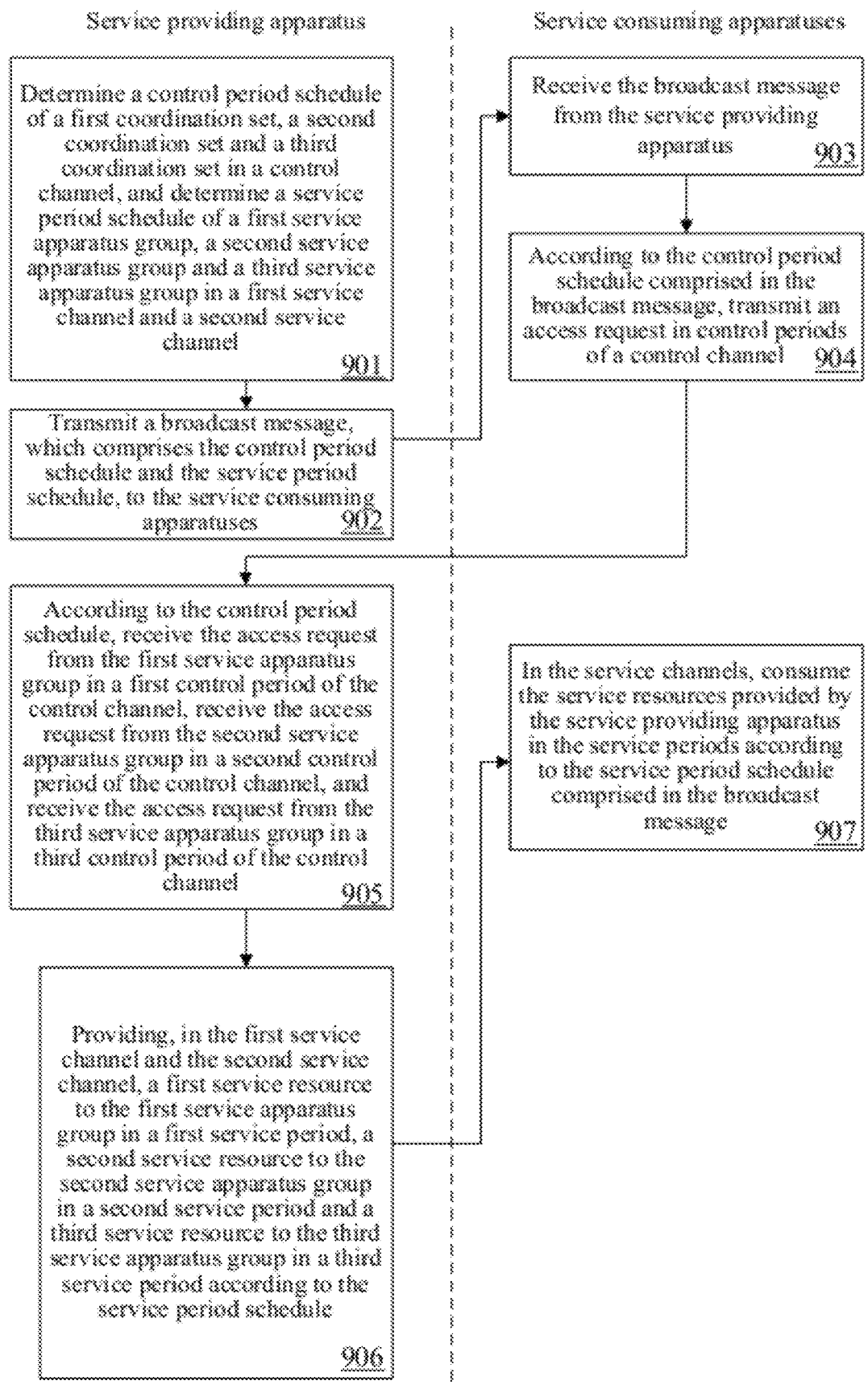
FIG. 9 is a flowchart of a service transmitting method of an eighth embodiment of the present invention.

An eighth embodiment of the present invention is another service transmitting method, a flowchart of which is shown in FIG. 9. The service transmitting method of the eighth embodiment is also adapted for a service providing apparatus and a service consuming apparatus (e.g., the service providing apparatus 11 and any of the service consuming apparatuses 13 described in the previous embodiments). The service providing apparatus connects to a plurality of service consuming apparatuses via a wireless network. Steps of the service transmitting method of the eighth embodiment will be detailed as follows.

Step 901 is executed to enable the service providing apparatus to determine a control period schedule of a first coordination set, a second coordination set and a third coordination set in a control channel, and determine a service period schedule of a first service apparatus group, a second service apparatus group and a third service apparatus group in at least one service channel. The third coordination set at least comprises the third service apparatus group, and the at least one service channel comprises a first service channel and a second service channel. Then, step 902 is executed to enable the service providing apparatus to transmit a broadcast message, which comprises the control period schedule and the service period schedule, to the service consuming apparatuses. The broadcast message is configured to notify the service consuming apparatuses that they are allocated into the first service apparatus group, the second service apparatus group and the third service apparatus group respectively, to notify the service consuming apparatuses of the first service apparatus group that they are included in the first coordination set, to notify the service consuming apparatuses of the second service apparatus group that they are included in the second coordination set, and to notify the service consuming apparatuses of the third service apparatus group that they are included in the third coordination set. Next, step 903 is executed to enable the service consuming apparatuses to receive the broadcast message from the service providing apparatus, obtain therefrom the control period schedule and the service period schedule, and learn therefrom allocations of the service consuming apparatuses in the first service apparatus group, the second service apparatus group and the third service apparatus group. Thus, the service consuming apparatuses allocated into the first service apparatus group can learn that they are included in the first coordination set, the service consuming apparatuses allocated into the second service apparatus group can learn that they are included in the second coordination set, and the service consuming apparatuses allocated into the third service apparatus group can learn that they are included in the third coordination set.

Thereafter, step 904 is executed to enable the service consuming apparatuses to, according to the control period schedule comprised in the broadcast message, transmit access requests in control periods of a control channel respectively. The control period schedule records a schedule of the coordinate sets in the control channel. Step 905 is executed to enable the service providing apparatus to, according to the control period schedule, receive the access request from the first service apparatus group included in the first coordination set in a first control period of the control channel, to receive the access request from the second service apparatus group included in the second coordination set in a second control period of the control channel, and to receive the access request from the third service apparatus group included in the third coordination set in a third control period of the control channel.

Next, step 906 is executed to enable the service providing apparatus to provide, in the first service channel and the second service channel, a first service resource to the first service apparatus group in a first service period, to provide a second service resource to the second service apparatus group in a second service period and to provide a third service resource to the third service apparatus group in a third service period according to the service period schedule. Step 907 is executed to enable the service consuming apparatuses to, in the first service channel and the second service channel, consume the service resources provided by the service providing apparatus in the service periods according to the service period schedule comprised in the broadcast message. In more detail, the service consuming apparatuses belonging to the first service apparatus group consume the first service resource in the first service period, the service consuming apparatuses belonging to the second service apparatus group consume the second service resource in the second service period, and the service consuming apparatuses belonging to the third service apparatus group consume the third service resource in the third service period. The service period schedule records a schedule of the service apparatus groups of the service consuming apparatuses in the service channels.

Figure 10:
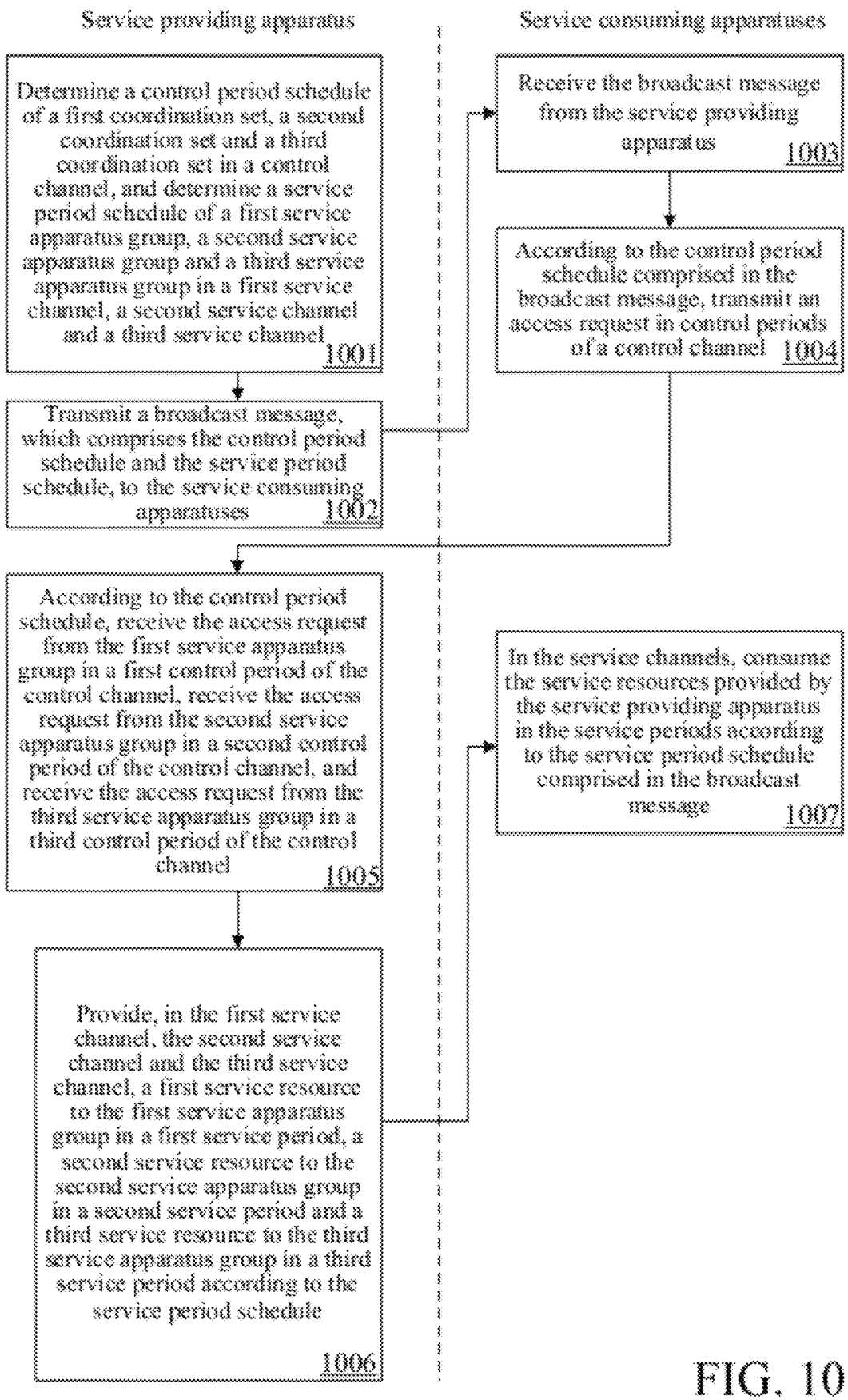
FIG. 10 is a flowchart of a service transmitting method of a ninth embodiment of the present invention.

A ninth embodiment of the present invention is another service transmitting method, a flowchart of which is shown in FIG. 10. The service transmitting method of the ninth embodiment is also adapted for a service providing apparatus and a service consuming apparatus (e.g., the service providing apparatus 11 and any of the service consuming apparatuses 13 described in the previous embodiments). The service providing apparatus connects to a plurality of service consuming apparatuses via a wireless network. Steps of the service transmitting method of the ninth embodiment will be detailed as follows.

Step 1001 is executed to enable the service providing apparatus to determine a control period schedule of a first coordination set, a second coordination set and a third coordination set in a control channel, and determine a service period schedule of a first service apparatus group, a second service apparatus group and a third service apparatus group in at least one service channel. The third coordination set at least comprises the third service apparatus group, and the at least one service channel comprises a first service channel, a second service channel and a third service channel. Then, step 1002 is executed to enable the service providing apparatus to transmit a broadcast message, which comprises the control period schedule and the service period schedule, to the service consuming apparatuses. The broadcast message is configured to notify the service consuming apparatuses that they are allocated into the first service apparatus group, the second service apparatus group and the third service apparatus group respectively, to notify the service consuming apparatuses of the first service apparatus group that they are included in the first coordination set, to notify the service consuming apparatuses of the second service apparatus group that they are included in the second coordination set, and to notify the service consuming apparatuses of the third service apparatus group that they are included in the third coordination set. Next, step 1003 is executed to enable the service consuming apparatuses to receive the broadcast message from the service providing apparatus, obtain therefrom the control period schedule and the service period schedule, and learn therefrom allocation of the service consuming apparatuses in the first service apparatus group, the second service apparatus group and the third service apparatus group. Thus, the service consuming apparatuses allocated into the first service apparatus group can learn that they are included in the first coordination set, the service consuming apparatuses allocated into the second service apparatus group can learn that they are included in the second coordination set, and the service consuming apparatuses allocated into the third service apparatus group can learn that they are included in the third coordination set.

Thereafter, step 1004 is executed to enable the service consuming apparatuses to, according to the control period schedule comprised in the broadcast message, transmit access requests in control periods of a control channel respectively. The control period schedule records a schedule of the coordinate sets in the control channel. Step 1005 is executed to enable the service providing apparatus to, according to the control period schedule, receive the access request from the first service apparatus group included in the first coordination set in a first control period of the control channel, to receive the access request from the second service apparatus group included in the second coordination set in a second control period of the control channel, and to receive the access request from the third service apparatus group included in the third coordination set in a third control period of the control channel.

Next, step 1006 is executed to enable the service providing apparatus to provide, in the first service channel, the second service channel and the third service channel, a first service resource to the first service apparatus group in a first service period, to provide a second service resource to the second service apparatus group in a second service period and to provide a third service resource to the third service apparatus group in a third service period according to the service period schedule. Step 1007 is executed to enable the service consuming apparatuses to, in the first service channel, the second service channel and the third service channel, consume the service resources provided by the service providing apparatus in the service periods according to the service period schedule comprised in the broadcast message. In more detail, the service consuming apparatuses belonging to the first service apparatus group consume the first service resource in the first service period, the service consuming apparatuses belonging to the second service apparatus group consume the second service resource in the second service period, and the service consuming apparatuses belonging to the third service apparatus group consume the third service resource in the third service period. The service period schedule records a schedule of the service apparatus groups of the service consuming apparatuses in the service channels.

According to the above descriptions, the service providing apparatus of the present invention divides a plurality of service consuming apparatuses in a wireless network into different groups and further allocates the groups into different group sets. Then, the service providing apparatus pre-schedules the group sets in a control channel and pre-schedules the groups in at least one service channel. Thereby, the service resources can be consumed by the service consuming apparatuses according to the schedules so as to make more efficient use of the channel resources.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A service transmitting method for a service providing apparatus, the service providing apparatus being adapted to connect to a plurality of service consuming apparatuses via a wireless network, the service transmitting method comprising the steps of:
   (a) enabling the service providing apparatus to determine a control period schedule of a first coordination set and a second coordination set in a control channel, and determine a service period schedule of a first service apparatus group and a second service apparatus group in at least one service channel, wherein the first coordination set at least comprises the first service apparatus group, and the second coordination set at least comprises the second service apparatus group;
   (b) enabling the service providing apparatus to transmit a broadcast message, which comprises the control period schedule and the service period schedule, to the service consuming apparatuses, wherein the broadcast message is configured to notify the service consuming apparatuses of being allocated into the first service apparatus group and the second service apparatus group respectively, to notify the service consuming apparatuses allocated into the first service apparatus group of being included in the first coordination set, and to notify the service consuming apparatuses allocated into the second service apparatus group of being included in the second coordination set;

(c) enabling the service providing apparatus to, according to the control period schedule, receive an access request from the first service apparatus group included in the first coordination set in a first control period of the control channel, and to receive an access request from the second service apparatus group included in the second coordination set in a second control period of the control channel; and (d) enabling the service providing apparatus to provide, in the at least one service channel, a first service resource to the first service apparatus group in a first service period and to provide a second service resource to the second service apparatus group in a second service period according to the service period schedule.

2. The service transmitting method as claimed in claim 1, wherein the step (a) further comprises the step of:

(a1) enabling the service providing apparatus to determine the control period schedule of the first coordination set, the second coordination set and a third coordination set in the control channel, and determine the service period schedule of the first service apparatus group, the second service apparatus group and a third service apparatus group in the at least one service channel, wherein the first coordination set at least comprises the first service apparatus group and the second service apparatus group, the second coordination set at least comprises the second service apparatus group and the third service apparatus group, and the third coordination set at least comprises the third service apparatus group and the first service apparatus group.

3. The service transmitting method as claimed in claim 2, wherein the step (b) further comprises the step of:

(b1) enabling the service providing apparatus to transmit the broadcast message, which comprises the control period schedule and the service period schedule, to the service consuming apparatuses, wherein the broadcast message is configured to notify the service consuming apparatuses of being allocated into the first service apparatus group, the second service apparatus group and the third service apparatus group respectively, and to notify the service consuming apparatuses allocated into the first service apparatus group of being included in the first coordination set and the third coordination set, to notify the service consuming apparatuses allocated into the second service apparatus group of being included in the first coordination set and the second coordination set, and to notify the service consuming apparatuses allocated into the third service apparatus group of being included in the second coordination set and the first coordination set.

4. The service transmitting method as claimed in claim 3, wherein the step (c) further comprises the step of:

(c1) enabling the service providing apparatus to, according to the control period schedule, receive access requests from the first service apparatus group and the second service apparatus group included in the first coordination set in the first control period of the control channel, to receive access requests from the second service apparatus group and the third service apparatus group included in the second coordination set in the second control period of the control channel, and to receive access requests from the third service apparatus group and the first service apparatus group included in the third coordination set in a third control period of the control channel.

5. The service transmitting method as claimed in claim 4, wherein the step (d) further comprises the step of:

(d1) enabling the service providing apparatus to provide, in the at least one service channel, the first service resource to the first service apparatus group in the first service period, to provide the second service resource to the second service apparatus group in the second service period and to provide a third service resource to the third service apparatus group in a third service period according to the service period schedule.

6. The service transmitting method as claimed in claim 1, wherein the step (a) further comprises the step of:

(a1) enabling the service providing apparatus to determine the control period schedule of the first coordination set, the second coordination set and a third coordination set in the control channel, and determine the service period schedule of the first service apparatus group, the second service apparatus group and a third service apparatus group in the at least one service channel, wherein the third coordination set at least comprises the third service apparatus group, and the at least one service channel comprises a first service channel and a second service channel.

7. The service transmitting method as claimed in claim 6, wherein the step (b) further comprises the step of:

(b1) enabling the service providing apparatus to transmit the broadcast message, which comprises the control period schedule and the service period schedule, to the service consuming apparatuses, wherein the broadcast message is configured to notify the service consuming apparatuses of being allocated into the first service apparatus group, the second service apparatus group and the third service apparatus group respectively, to notify the service consuming apparatuses allocated into the first service apparatus group of being included in the first coordination set, to notify the service consuming apparatuses allocated into the second service apparatus group of being included in the second coordination set, and to notify the service consuming apparatuses allocated into the third service apparatus group of being included in the third coordination set.

8. The service transmitting method as claimed in claim 7, wherein the step (c) further comprises the step of:

(c1) enabling the service providing apparatus to, according to the control period schedule, receive the access request from the first service apparatus group included in the first coordination set in the first control period of the control channel, to receive the access request from the second service apparatus group included in the second coordination set in the second control period of the control channel, and to receive the access request from the third service apparatus group included in the third coordination set in a third control period of the control channel.

9. The service transmitting method as claimed in claim 8, wherein the step (d) further comprises the step of:

(d1) enabling the service providing apparatus to provide, in the first service channel and the second service channel, the first service resource to the first service apparatus group in the first service period, to provide the second service resource to the second service apparatus group in the second service period and to provide a third service resource to the third service apparatus group in a third service period according to the service period schedule.

10. The service transmitting method as claimed in claim 1, wherein the step (a) further comprises the step of:
(a1) enabling the service providing apparatus to determine the control period schedule of the first coordination set, the second coordination set and a third coordination set in the control channel, and determine the service period schedule of the first service apparatus group, the second service apparatus group and a third service apparatus group in the at least one service channel, wherein the third coordination set at least comprises the third service apparatus group, and the at least one service channel comprises a first service channel, a second service channel and a third service channel.

11. The service transmitting method as claimed in claim 10, wherein the step (b) further comprises the step of:
(b1) enabling the service providing apparatus to transmit the broadcast message, which comprises the control period schedule and the service period schedule, to the service consuming apparatuses, wherein the broadcast message is configured to notify the service consuming apparatuses that they are allocated into the first service apparatus group, the second service apparatus group and the third service apparatus group respectively, to notify the service consuming apparatuses allocated into the first service apparatus group of being included in the first coordination set, to notify the service consuming apparatuses allocated into the second service apparatus group of being included in the second coordination set, and to notify the service consuming apparatuses allocated into the third service apparatus group of being included in the third coordination set.

12. The service transmitting method as claimed in claim 11, wherein the step (c) further comprises the step of:
(c1) enabling the service providing apparatus to, according to the control period schedule, receive the access request from the first service apparatus group included in the first coordination set in the first control period of the control channel, to receive the access request from the second service apparatus group included in the second coordination set in the second control period of the control channel, and to receive the access request from the third service apparatus group included in the third coordination set in a third control period of the control channel.

13. The service transmitting method as claimed in claim 12, wherein the step (d) further comprises the step of:
(d1) enabling the service providing apparatus to provide, in the first service channel, the second service channel and the third service channel, the first service resource to the first service apparatus group in the first service period, to provide the second service resource to the second service apparatus group in the second service period and to provide a third service resource to the third service apparatus group in a third service period according to the service period schedule.

14. A service transmitting method for a service consuming apparatus, the service consuming apparatus being adapted to connect to a service providing apparatus via a wireless network, the service transmitting method comprising the steps of:
(a) enabling the service consuming apparatus to receive a broadcast message from the service providing apparatus, wherein the broadcast message comprises a control period schedule and a service period schedule and is configured to notify the service consuming apparatus that the service consuming apparatus is allocated into a service apparatus group and that the service apparatus group is included in at least one coordination set;
(b) enabling the service consuming apparatus to transmit an access request in a control period of a control channel according to the control period schedule of the broadcast message, wherein the control period schedule records a schedule of the at least one coordination set in the control channel; and
(c) enabling the service consuming apparatus to consume a service resource provided by the service providing apparatus in a service period of at least one service channel according to the service period schedule of the broadcast message, wherein the service period schedule records a schedule of the service apparatus group in the at least one service channel.

15. A service providing apparatus, being adapted to connect to a plurality of service consuming apparatuses via a wireless network, the service providing apparatus comprising:
a processing module, being configured to determine a control period schedule of a first coordination set and a second coordination set in a control channel, and determine a service period schedule of a first service apparatus group and a second service apparatus group in at least one service channel, wherein the first coordination set at least comprises the first service apparatus group, and the second coordination set at least comprises the second service apparatus group;
a transceiver, being configured to transmit a broadcast message, which comprises the control period schedule and the service period schedule, to the service consuming apparatuses, wherein the broadcast message is configured to notify the service consuming apparatuses of being allocated into the first service apparatus group and the second service apparatus group respectively, to notify the service consuming apparatuses allocated into the first service apparatus group of being included in the first coordination set, to notify the service consuming apparatuses allocated into the second service apparatus group of being included in the second coordination set, and being further configured to, according to the control period schedule, receive an access request from the first service apparatus group included in the first coordination set in a first control period of the control channel, and to receive an access request from the second service apparatus group included in the second coordination set in a second control period of the control channel; and
a service module, being configured to provide, in the at least one service channel, a first service resource to the first service apparatus group in a first service period and to provide a second service resource to the second service apparatus group in a second service period according to the service period schedule.

16. The service providing apparatus as claimed in claim 15, wherein the processing module is further configured to determine the control period schedule of the first coordination set, the second coordination set and a third coordination set in the control channel, and determine the service period schedule of the first service apparatus group, the second service apparatus group and a third service apparatus group in the at least one service channel, wherein the first coordination set at least comprises the first service apparatus group and the second service apparatus group, the second coordination set at least comprises the second service apparatus group and the third service apparatus group, and the third coordination set at least comprises the third service apparatus group and the first service apparatus group.

17. The service providing apparatus as claimed in claim 16, wherein the transceiver is further configured to transmit the broadcast message, which comprises the control period schedule and the service period schedule, to the service consuming apparatuses, wherein the broadcast message is configured to notify the service consuming apparatuses of being allocated into the first service apparatus group, the second service apparatus group and the third service apparatus group respectively, to notify the service consuming apparatuses allocated into the first service apparatus group of being included in the first coordination set and the third coordination set, to notify the service consuming apparatuses allocated into the second service apparatus group of being included in the first coordination set and the second coordination set, and to notify the service consuming apparatuses allocated into the third service apparatus group of being included in the second coordination set and the first coordination set.

18. The service providing apparatus as claimed in claim 17, wherein the transceiver is further configured to, according to the control period schedule, receive access requests from the first service apparatus group and the second service apparatus group included in the first coordination set in the first control period of the control channel, to receive access requests from the second service apparatus group and the third service apparatus group included in the second coordination set in the second control period of the control channel, and to receive access requests from the third service apparatus group and the first service apparatus group included in the third coordination set in a third control period of the control channel.

19. The service providing apparatus as claimed in claim 18, wherein the service module is further configured to provide, in the at least one service channel, the first service resource to the first service apparatus group in the first service period, to provide the second service resource to the second service apparatus group in the second service period and to provide a third service resource to the third service apparatus group in a third service period according to the service period schedule.

20. The service providing apparatus as claimed in claim 15, wherein the processing module is further configured to determine the control period schedule of the first coordination set, the second coordination set and a third coordination set in the control channel, and determine the service period schedule of the first service apparatus group, the second service apparatus group and a third service apparatus group in the at least one service channel, wherein the third coordination set at least comprises the third service apparatus group, and the at least one service channel comprises a first service channel and a second service channel.

21. The service providing apparatus as claimed in claim 20, wherein the transceiver is further configured to transmit the broadcast message, which comprises the control period schedule and the service period schedule, to the service consuming apparatuses, wherein the broadcast message is configured to notify the service consuming apparatuses of being allocated into the first service apparatus group, the second service apparatus group and the third service apparatus group, and to notify the service consuming apparatuses allocated into the first service apparatus group of being included in the first coordination set, to notify the service consuming apparatuses allocated into the second service apparatus group of being included in the second coordination set, and to notify the service consuming apparatuses allocated into the third service apparatus group of being included in the third coordination set.

22. The service providing apparatus as claimed in claim 21, wherein the transceiver is further configured to, according to the control period schedule, receive the access request from the first service apparatus group included in the first coordination set in the first control period of the control channel, to receive the access request from the second service apparatus group included in the second coordination set in the second control period of the control channel, and to receive the access request from the third service apparatus group included in the third coordination set in a third control period of the control channel.

23. The service providing apparatus as claimed in claim 22, wherein the service module is further configured to provide, in the first service channel and the second service channel, the first service resource to the first service apparatus group in the first service period, to provide the second service resource to the second service apparatus group in the second service period and to provide a third service resource to the third service apparatus group in a third service period according to the service period schedule.

24. The service providing apparatus as claimed in claim 15, wherein the processing module is further configured to determine the control period schedule of the first coordination set, the second coordination set and a third coordination set in the control channel, and determine the service period schedule of the first service apparatus group, the second service apparatus group and a third service apparatus group in the at least one service channel, wherein the third coordination set at least comprises the third service apparatus group, and the at least one service channel comprises a first service channel, a second service channel and a third service channel.

25. The service providing apparatus as claimed in claim 24, wherein the transceiver is further configured to transmit the broadcast message, which comprises the control period schedule and the service period schedule, to the service consuming apparatuses, wherein the broadcast message is configured to notify the service consuming apparatuses of being allocated into the first service apparatus group, the second service apparatus group and the third service apparatus group respectively, to notify the service consuming apparatuses allocated into the first service apparatus group of being included in the first coordination set, to notify the service consuming apparatuses allocated into the second service apparatus group of being included in the second coordination set, and to notify the service consuming apparatuses allocated into the third service apparatus group of being included in the third coordination set.

26. The service providing apparatus as claimed in claim 25, wherein the transceiver is further configured to, according to the control period schedule, receive the access request from the first service apparatus group included in the first coordination set in the first control period of the control channel, to receive the access request from the second service apparatus group included in the second coordination set in the second control period of the control channel, and to receive the access request from the third service apparatus group included in the third coordination set in a third control period of the control channel.

27. The service providing apparatus as claimed in claim 26, wherein the service module is further configured to provide, in the first service channel, the second service channel and the third service channel, the first service resource to the first service apparatus group in the first service period, to provide the second service resource to the second service apparatus group in the second service period and to provide a third service resource to the third service apparatus group in a third service period according to the service period schedule.

28. A service consuming apparatus, being adapted to connect to a service providing apparatus via a wireless network, the service consuming apparatus comprising:

a transceiver, being configured to receive a broadcast message from the service providing apparatus, wherein the broadcast message comprises a control period schedule and a service period schedule and is configured to notify the service consuming apparatus that the service consuming apparatus is allocated into a service apparatus group and that the service apparatus group is included in at least one coordination set, and being further configured to transmit an access request in a control period of a control channel according to the control period schedule of the broadcast message, wherein the control period schedule records a schedule of the at least one coordination set in the control channel; and a processing module, being configured to consume a service resource provided by the service providing apparatus in a service period of at least one service channel according to the service period schedule of the broadcast message, wherein the service period schedule records a schedule of the service apparatus group in the at least one service channel.

* * * * *